United States Patent [19]

Kikuchi

[11] Patent Number: 5,825,905
[45] Date of Patent: Oct. 20, 1998

[54] MUSICAL SCORE RECOGNITION APPARATUS WITH VISUAL SCANNING AND CORRECTION

[75] Inventor: Takeshi Kikuchi, Hamamatsu, Japan

[73] Assignee: Yamaha Corporation, Hamamatsu, Japan

[21] Appl. No.: 314,341

[22] Filed: Sep. 28, 1994

[30] Foreign Application Priority Data

| Oct. 20, 1993 | [JP] | Japan | 5-2623519 |
| Nov. 25, 1993 | [JP] | Japan | 5-295423 |
| Feb. 15, 1994 | [JP] | Japan | 6-018159 |

[51] Int. Cl.$^6$ .................................................. G06K 9/00
[52] U.S. Cl. .......................... 382/113; 382/311; 345/340
[58] Field of Search .................................. 382/100, 113, 382/309–311, 298, 301; 395/340–345; 345/116, 119, 117, 340, 341, 342, 343, 344, 345

[56] References Cited

U.S. PATENT DOCUMENTS

| 4,599,612 | 7/1986 | Kaji et al. ............................... 340/723 |
| 4,974,260 | 11/1990 | Rudak ...................................... 382/309 |
| 5,025,484 | 6/1991 | Yamanari et al. ........................ 382/309 |
| 5,054,096 | 10/1991 | Beizer ...................................... 382/305 |
| 5,222,160 | 6/1993 | Sakai et al. ............................... 382/309 |

FOREIGN PATENT DOCUMENTS

| 63-241595 | 10/1988 | Japan ............................... G10G 3/04 |
| 2-51396 | 4/1990 | Japan ............................... G10G 3/04 |
| 2-300792 | 12/1990 | Japan ............................... G10G 3/04 |
| 4-57183 | 2/1992 | Japan ............................... G06K 9/62 |

OTHER PUBLICATIONS

Kato, H., et al., "Automatic Recognition of Printed Piano Music Based on Bar Unit Processing", The Transaction of the institute of Electronics, Information and Communications Engineers, vol. J71–D No. 5, pp. 894–901, May 25, 1988.

"OmniPage Professional"screen capture. Caere Corporation, 1994, 3 pp.

Matsushima, Toshiaki, et al., "Automated Recognition System for Musical Score—The Vision System of WABOT–2–", Bulletin of Science and Engineering Research Laboratory Waseda Univerdity No. 112 (1985) pp. 25–52.

Primary Examiner—Andrew W. Johns
Attorney, Agent, or Firm—Pillsbury Madison Sutro & LLP

[57] ABSTRACT

A score recognition apparatus initially reads a given musical score to form an original image data. The original image data is analyzed to successively recognize symbols contained in the musical score to produce a score code data. Then, a synthetic image data of the musical score is reproduced according to the score code data. The score recognition apparatus has a monitor receptive of the original image data and the synthetic image data to display an original image and a synthetic image in parallel to each other. An operation command is inputted to command a screen operation of the displayed image. The pair of the original and synthetic image data are concurrently processed according to the operation command to execute the screen operation of both the original and synthetic images in parallel manner. Further, the pair of the original and synthetic image data are compared with each other to detect a discrepancy portion between the original image and the synthetic image to produce a discrepancy image data. The monitor is controlled according to the discrepancy image data to visually indicate the discrepancy portion.

14 Claims, 23 Drawing Sheets

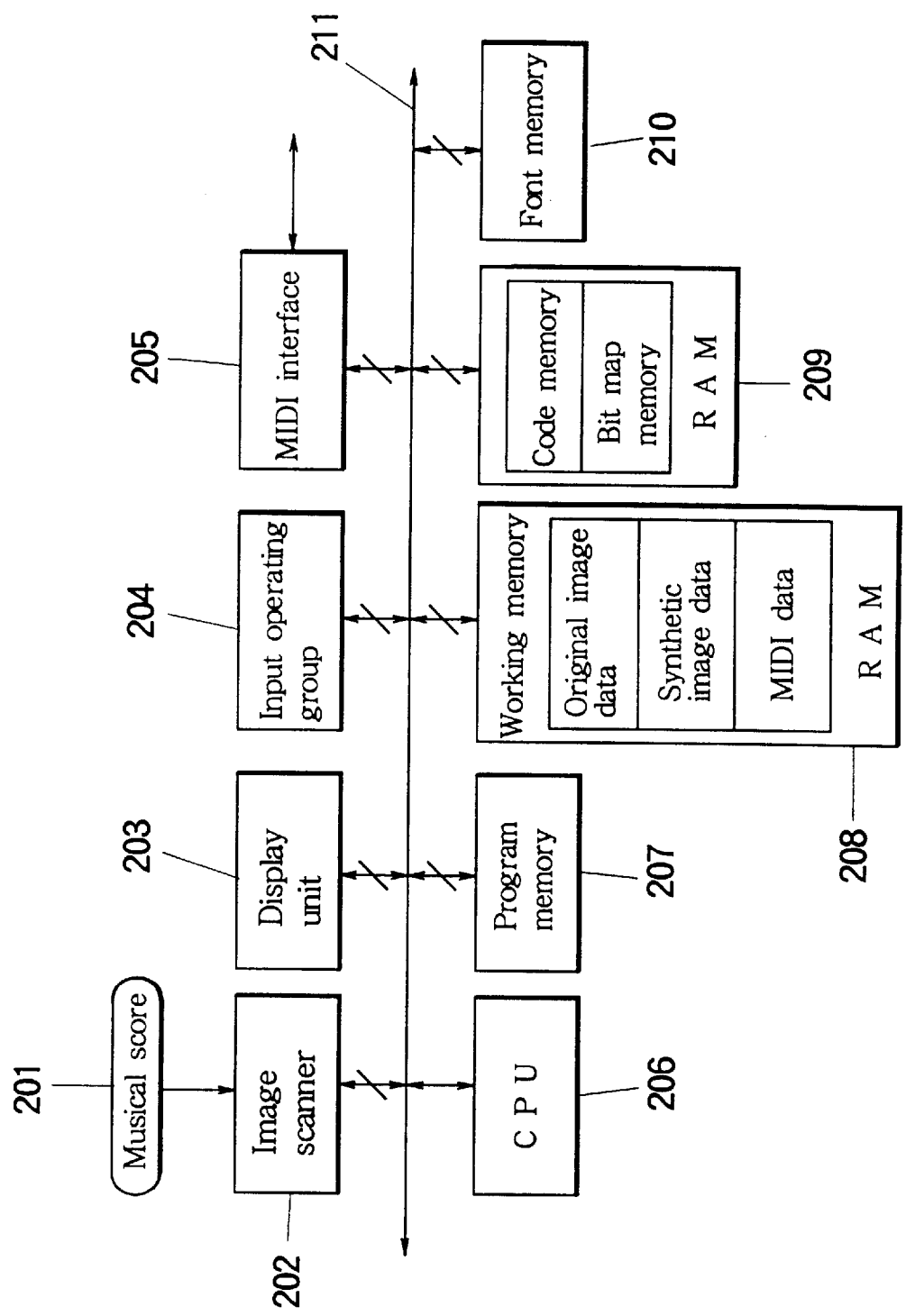

Code memory

Bit map memory

FIG.25A
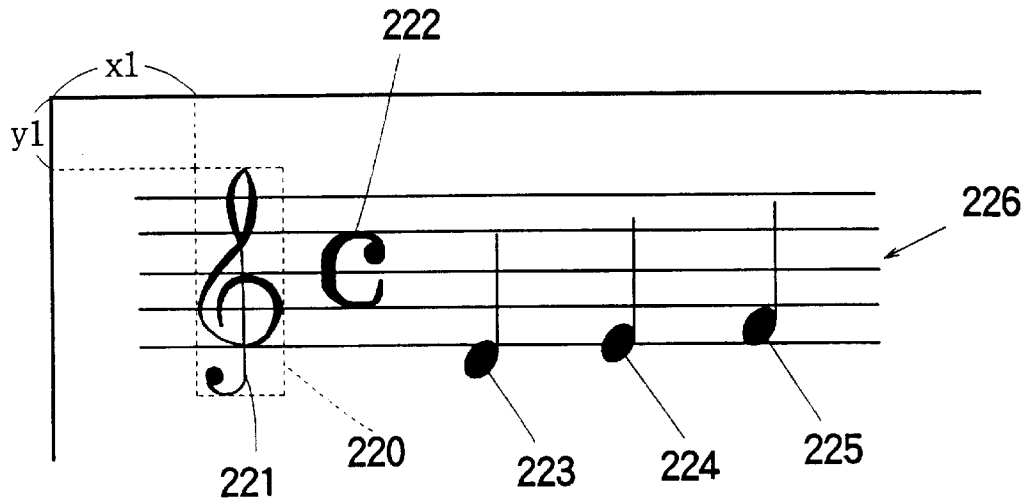
FIG.25B
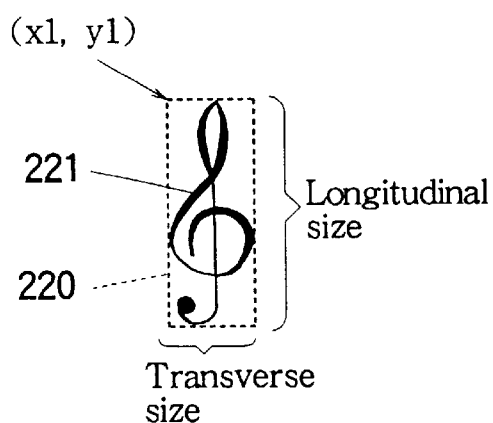
FIG.25C
| Symbol code ( c ) |
| Position data |
| Symbol code ( ♩ ) |
| Position data |
| Symbol code ( ♩ ) |
| Position data |
| Symbol code ( ♩ ) |
| Position data |
| Faulty code |
| Position data |
| Transverse dot number |
| Longitudinal dot number |
| Start address |

MUSICAL SCORE RECOGNITION APPARATUS WITH VISUAL SCANNING AND CORRECTION

BACKGROUND OF THE INVENTION

The present invention relates to a musical score recognition apparatus for optically reading a musical score sheet to form a two-dimensional image data, for analyzing the image data to recognize notes and other symbols, and for effecting an automatic musical performance based on recognized results. More particularly, the present invention relates to an image processing technology to realize comparative display of an original score and the recognized score, visual discrepancy indication therebetween, and visual notification of indefinite symbols which fails in recognition or interpretation.

For example, Japanese patent application laid-open No. 5-35924 discloses a score recognition apparatus operable to read a score print by an image scanner or else to form an original image data, and subsequently to recognize therefrom score elements such as notes and other symbols to produce a performance data such as Musical Instrument Digital Interface (MIDI) data. The score recognition apparatus analyzes the original image data obtained by reading the score sheet through the image scanner to carry out recognition of various score elements including staff lines, notes, sharp (♯), flat (♭), rest, G clef and F clef. The conventional score recognition apparatus hardly achieves 100% of a recognition rate. Therefore, it is necessary to display the results of the score recognition in order to visually check the same to find a recognition error, and in order to correct a score data if necessary. In such a case, the recognized results and the original score must be visually compared with each other. However, the conventional score recognition apparatus is not constructed to facilitate the visual comparison.

The score recognition apparatus receives an original image data representative of a source score, and recognizes contents thereof to produce an automatic performance data, a print data or else. However, the conventional score recognition apparatus cannot achieve 100% of accuracy. Therefore, a user finally checks the recognized results to manually correct recognization errors. However, the conventional score recognition apparatus displays separately an inputted original score and a synthetic score reproduced according to the recognition results. Thus, the user must compare the original score and the synthetic score with each other to find a discrepancy therebetween, which would cause an overlook and a mistake in correction of the recognition results.

The conventional score recognition apparatus hardly achieves 100% of the recognition rate. Particularly, it is quite difficult to perfectly recognize a hand-written score sheet. Consequently, the reproduced score may contain indefinite score symbols which fail in recognition. However, the conventional apparatus is not constructed to visually indicate an existence of indefinite score elements to the user. Therefore, the user may inadvertently accept the recognized results as a perfect form even though indefinite score elements are actually involved. In addition, the recognition process of the score sheet requires a long time. The recognized results are displayed after the recognition process is completed throughout the whole of the original image data, hence the user disadvantageously waits for a long time from inputting of read score contents until visual outputting of the recognized results.

SUMMARY OF THE INVENTION

In view of the above noted drawbacks of the prior art, a first object of the present invention is to provide a screen operation technology effective to facilitate parallel comparison on a screen between an original score and a synthetic score obtained by recognition. Further, a second object of the present invention is to provide an image processing technology effective to visually indicate a discrepancy between the original score and the synthetic score on the screen to facilitate correction of the recognized results. Moreover, a third object of the present invention is to provide an image processing technology effective to explicitly visualize an indefinite score element which fails in the recognition process.

According to a first aspect of the present invention, a score recognition apparatus comprises reading means for reading a score to form an original image data of the score, recognizing means for analyzing the original image data to recognize therefrom score elements to thereby produce a corresponding score data, synthesizing means for reproducing a synthetic image data of the score based on the score data, display means having a screen and being receptive of the original image data and the synthetic image data for displaying an original image and a synthetic image of the same score on the screen in parallel to each other for visual comparison, command means for inputting an operation command effective to control a screen operation of a displayed image, operation means responsive to the operation command for processing the original image data and the synthetic image data in parallel to each other so as to execute the screen operation of the original image and the synthetic image coincidently with each other to thereby facilitate the visual comparison therebetween. In a preferred form, the command means comprises means for inputting an operational command effective to command a screen operation of the displayed image by scaling, scrolling or sizing. In another preferred form, the operation means includes means for optimizing a relative arrangement of the original image and the synthetic image displayed on the screen according to the screen operation. By such a construction, the display means displays both of the original image representative of the original score and the synthetic image representative of the recognition results in the same window. The original image and the synthetic image can be operated on the screen in parallel manner in response to a common operation command to thereby facilitate one-to-one comparison between the original image and the synthetic image.

According to a second aspect of the invention, a score recognition apparatus comprises reading means for reading a score to form an original image data of the score, recognizing means for analyzing the original image data to recognize therefrom score elements to thereby produce a corresponding score data, synthesizing means for reproducing a synthetic image data of the same score based on the score data, display means receptive of the original image data and the synthetic image data for displaying either of an original image and a synthetic image of the score, detecting means for comparing the original image data and the synthetic image data with each other to detect a discrepancy portion between the original image and the synthetic image to thereby produce a corresponding discrepancy image data, and indicating means for controlling the display means according to the discrepancy image data to visually indicate the detected discrepancy portion. In a preferred form, the synthesizing means comprises means for reproducing the synthetic image data divided into two parts, one of which represents a score element of a staff identical to the original image data, and the other of which represents the remaining score elements reproduced on the staff according to the score data. Further, the indicating means comprises means for feeding the discrepancy image data concurrently with either of the original image data and the synthetic image data to the display means so that the discrepancy portion is displayed discriminatively in superposed relation to either of the original image and the synthetic image. Still further, the indicating means comprises means for differently indicating a first discrepancy portion which lacks solely from the original image and a second discrepancy portion which lacks solely from the synthetic image such as to discriminate the first discrepancy portion and the second discrepancy portion from each other. Moreover, the indicating means comprises means for selectively indicating blocks of the discrepancy portion, which are larger than a predetermined dimension. In another form, the detecting means includes means for provisionally erasing a score element of a staff from both of the original image data and the synthetic image data, which are then compared with each other to detect a discrepancy portion with respect to the remaining score elements involved in the score. By such a construction, the reading means reads the score to input the original image data. For example, an image scanner is utilized to optically reads the score. Otherwise, the original image data may be provided from an external device through a telecommunication line or else. The inputted original image data is stored in the score recognition apparatus. The recognizing means processes the original image data to successively interpret therefrom score elements to produce a score data. The score data represents a kind and a position of an individual score element such as a note, a rest and other symbols including a slur, a tie, a forte (f) and a piano (p). The synthesizing means reproduces the synthetic image data of the score based on the score data. The synthetic image data is also stored in the apparatus. If the recognizing means forms a perfect score data, the synthetic image data and the original image data exactly coincide with each other. However, if a recognition error exists, a discrepancy portion is generated between the synthetic and original image data. The recognition error is corrected by manual operation of the user. In such a case, the detecting means compares the original image data and the synthetic image data with each other to detect the discrepancy portion therebetween. Further, the indicating means visually indicates the discrepancy portion on the display screen based on the detection results in order to facilitate check of the discrepancy between the original image and the synthetic image. The user graphically carries out correction based on the visual indication to make a perfect score data. Preferably, the original and synthetic images are reconstructed on the identical staff lines. By this, the correctly recognized symbols such as notes are reconstructed in the same shape at the same position as those of the original symbols to thereby facilitate comparison therebetween to ensure accurate detection of the discrepancy portion. Further, the discrepancy portion is displayed in superposed relation with either of the original image and the synthetic image. In such a case, the discrepancy portion is indicated in a distinct form which is graphically different from the background original or synthetic image to thereby readily discriminate and find the discrepancy portion. The distinct form may be such that the discrepancy portion is displayed in a different color tone, or is presented in a different pattern. In variation, the visual indication of the discrepancy portion is divided into two parts of different forms, one of which solely belongs to the original image, and the other of which solely belongs to the synthetic image. By this, judgement can be easily made as to whether an individual discrepancy portion is due to missing of a necessary symbol in the synthetic image, or due to addition of an unnecessary symbol to the synthetic image, thereby facilitating the correction work. In another form, a discrepancy portion larger than a predetermined size is selectively displayed. By this, the displayed discrepancy portion is made free of tiny dots due to a stain on the score sheet or a negligible deformation of original symbol patterns. Accordingly, a substantial discrepancy portion can be selectively indicated to further facilitate finding of the recognition error. Moreover, the staff lines may be provisionally erased from both of the original and synthetic image data before detection of the discrepancy portion therebetween. The staff lines are a basic score element, and therefore the staff lines are considered to be in order. In view of this, the staff lines are precluded from the comparison to thereby achieve ready and fast detection of the discrepancy portion.

According to a third aspect of the invention, a score recognition apparatus comprises reading means for reading a score to form an original image data of the score, recognizing means for analyzing the original image data to recognize therefrom score symbols to thereby produce a corresponding score code data, synthesizing means for decoding the score code data to discriminate between a definite score symbol which succeeds in recognition and an indefinite score symbol which fails in recognition, and for reproducing a synthetic image data of the score containing the definite and indefinite score symbols based on the score code data, and display means for displaying a synthetic image of the score according to the synthetic image data in such a manner that the definite and indefinite score symbols are visually discriminated from each other. In a preferred form, the synthesizing means comprises means for reproducing the synthetic image data divided into two parts, one of which is formed according to the score code data to represent the definite score symbol, and the other of which is copied from the original image data to represent the indefinite score symbol as it is. Further, the score recognition apparatus includes editing means for inputting a correct score code data to the indefinite score symbol with reference to the displayed synthetic image of the score to complete the recognition of the score symbols. In detail, the editing means comprises means for graphically editing the displayed synthetic image such as to select one of score symbol items listed in the display means, and to replace the indefinite score symbol by the selected score symbol item to thereby input a correct score code data. Moreover, the recognizing means includes means for dividing the original image data into a plurality of data sections corresponding to a plurality of performance units of the score, and means operative when the analyzing of one data section is completed for feeding a part of the score code data corresponding to said one data section to the synthesizing means. By such a construction, the display means presents the definite symbol which is successfully recognized and the indefinite symbol which cannot be recognized, in different graphic forms distinct from each other to thereby enable the user to readily discriminate the definite and indefinite symbols from each other. The indefinite symbol can be replaced by an adequate symbol by graphic operation to thereby facilitate the correction work.

BRIEF DESCRIPTION OF DRAWINGS

FIG. 23 is a block diagram showing a third embodiment of the inventive score recognition apparatus.

FIG. 25A is an illustrative diagram showing a display example of the score original image.

FIG. 25B is an illustrative diagram showing an example of an indefinite symbol which fails in the recognition and is memorized in the bit map memory.

FIG. 25C is an illustrative diagram showing a memorization of the recognition results of the score symbols.

DETAILED DESCRIPTION OF EMBODIMENTS

Figure 13:
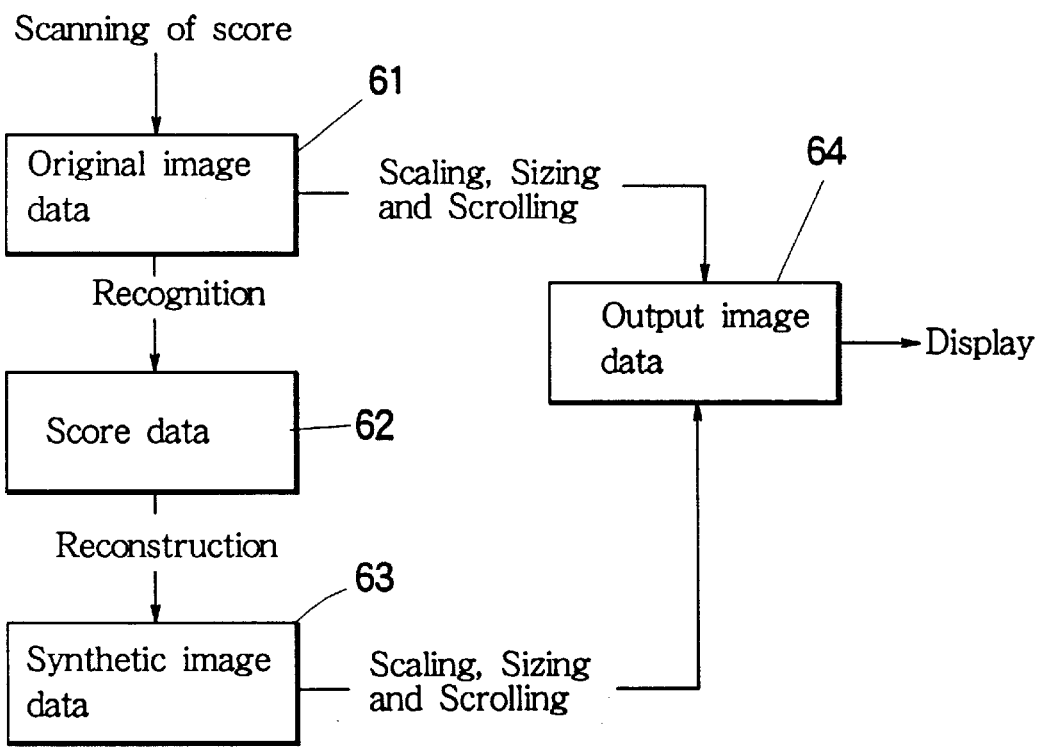
FIG. 13 is an illustrative block diagram showing the screen operation for checking the recognition results in the first embodiment of the present invention.

Referring to FIG. 13, a first embodiment of the inventive musical score recognition apparatus is constructed to perform a screen operation for checking of score recognition results. Reading means such as an image scanner is utilized to read a printed or handwritten musical score sheet to input an original image data 61 representative of a two-dimensional image of the score sheet, which is stored in a memory of a computer. A recognition process of musical score elements such as a note and other symbols is carried out based on the original image data 61 to produce a score data 62 which contains a code data representative of items of the recognized symbols and a position data representative of positions of the recognized symbols in the score.

In the recognition process, firstly staff lines are detected to determine a position, an interval and a thickness of the staff lines. Then, the detected staff lines are erased from the original image data 61 to provide a first working image data. Next, pattern matching or other methods is applied to the first working image data so as to recognize score elements such as a note and other symbols and so as to determine a position of the recognized symbols in the score. The position is determined in terms of two-dimensional coordinates fixed to the score image. Further, in the recognition process, a performance data such as a MIDI data is formed according to the recognized score elements. The MIDI data may be fed to a tone generator to carry out automatic musical performance of the score.

The score data 62 representative of the recognized score elements is subjected to a reconstruction process to reproduce a synthetic image data 63 of the score. In the reconstruction process, staff lines are drawn in an image field at positions corresponding to the positions of the recognized staff lines. Then, fonts of the score elements are retrieved from a memory in a suitably enlarged or reduced form, and are placed on the drawn staff lines according to the position data of the recognition results so as to reproduce the synthetic image data 63. By such an operation, the apparatus produces the pair of the original image data 61 of the score inputted by the image scanner, and the synthetic image data 63 reconstructed by the score data 62 which is obtained by the recognition process.

The original image data 61 is subjected to screen operation, if necessary, such as scaling screen operation for magnifying or reducing a region of the image data to be displayed, sizing screen operation for adjusting a size and shape of a display window area of the image, and scrolling screen operation of the image, to thereby form a part of an output image data 64. Concurrently, the synthetic image data 63 is subjected to the same screen operation such as the scaling, sizing and scrolling to thereby form another part of the output image data 64. The composite output image data 64 is formed based on the original image data 61 and the synthetic image data 63, and is written into a display RAM. Display means such as a CRT visually reproduces the output image data 64 to display an original image of the score inputted by the image scanner and a synthetic image of the same score reconstructed according to the recognized score data on a screen of the CRT in parallel manner to each other within a pair of split window areas defined on the screen.

Figure 1:
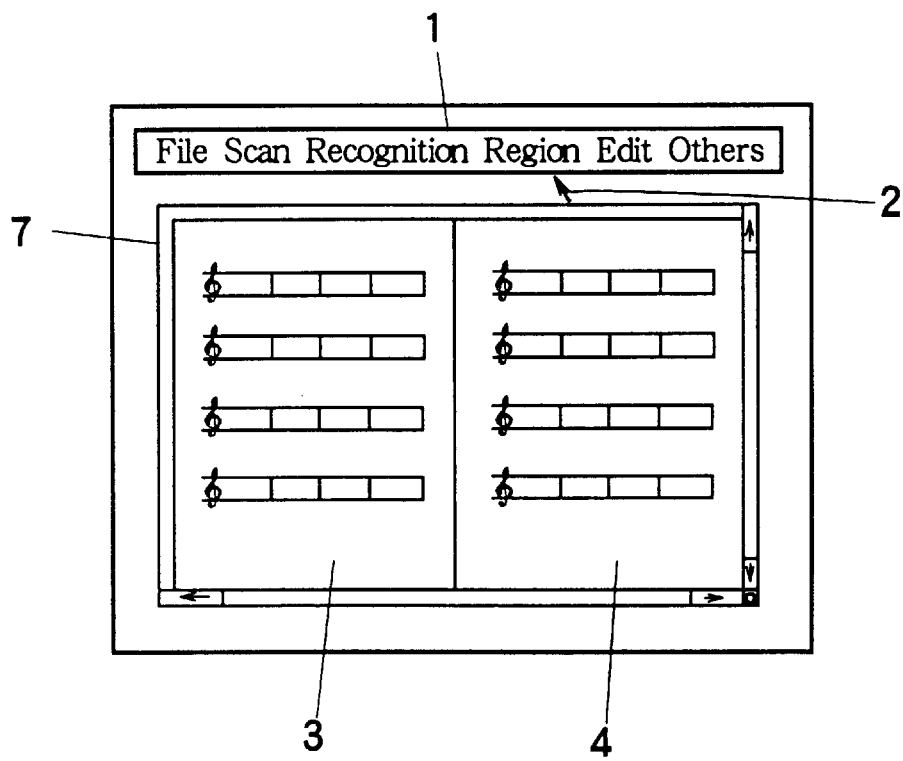
FIG. 1 is an illustrative diagram showing display of an original image obtained by reading a musical score sheet through an image scanner, and a synthetic image representative of recognition results of the score sheet.

Referring to FIG. 1, the display screen visually presents the original image and the synthetic image of the same score in parallel manner. The display screen contains a menu bar 1 and a display window 7. The menu bar 1 contains various items associated to various operations. The menu items can be selected to execute desired operations. Command means such as a mouse implement is utilized to select a desired item from the menu bar 1. The apparatus has a computer connected to a display device as an output terminal, and also connected to a mouse implement as an input terminal. A user of the computer system actuates the mouse implement to input an operation command, while results of the executed operation are visually demonstrated on the screen.

A cursor 2 is indicated on the screen. The cursor 2 moves along the screen in response to actuation of the mouse implement. A desired menu item is selected by moving the cursor 2 to the desired target within the menu bar 1 and by subsequent clicking of a mouse button. The menu bar 1 contains six items "File", "Scan", "Recognition", "Region", "Edit" and "Others". When "Scan" is selected from the menu bar 1, the image scanner carries out reading of the score sheet so that the sensed original data of the score is stored in a memory. The original image data is visually presented as an original image 3 within a left area of the display window 7. The original image 3 represents the score sheet read by the image scanner as it is.

When "Recognition" is selected from the menu bar 1, musical score elements such as staff lines and notes are recognized to produce a score data composed of a code data representative of symbols such as notes and a position data representative of a position of each symbol relative to the staff lines. Further, a synthetic image data is produced according to the score data. Since the position, interval and width of the staff lines are recognized from the score sheet, initially the basic element of the staff lines is reconstructed on an image data field according to the recognized staff information. Further, the remaining elements such as notes and other symbols are reconstructed on the staff lines according to the code and position data of the remaining elements to thereby reproduce the synthetic image data of the same score. A synthetic image can be visually presented on the screen using internal fonts of the symbols provisionally stored in a memory.

The synthetic image data is visually reproduced as a synthetic image 4 within a right area of the display window 7. The synthetic image 4 is reproduced according to the position data of the recognized score elements, hence the synthetic image 4 contains the staff, notes and other symbols positioned substantially at the same place of the score as the original image 3.

The synthetic image 4 represents the recognition results in the form of the score, hence the synthetic image 4 contains successfully recognized elements in the same manner as the original image 3. On the other hand, a score element which fails to recognize is contained in the synthetic image in a different manner than the successful elements. Thus, the pair of the original image 3 and the synthetic image 4 within the display window 7 must be compared with each other to check as to if the recognition is correctly carried out. Such a check can be readily conducted since the original image 3 and the synthetic image 4 are indicated in parallel to each other within the display window 7. More importantly, the same score elements such as the score, note and else are displayed in corresponding positions of the respective original and synthetic images 3, 4.

An editing operation is called if a recognition error of the score element is found by the comparison between the original image 3 and the synthetic image 4. In such a case, "Edit" is selected from the menu bar 1 such that the recognized score data can be edited with reference to the synthetic image by a graphic operation on the screen. In this editing operation, a score element involved in the recognition error is subjected to editing such as addition, deletion, alteration and else to correct the score data. Further, when "File" is selected from the menu bar 1, filing operations such as deletion and copy are applied to files of the image data, MIDI data and else.

When "Others" is selected from the menu bar 1, various operations are called such as automatic performance of the score, and printing of the score synthetic image. In the automatic performance operation, a tone generator receives a MIDI data derived from the score data obtained by recognition of the read score sheet to acoustically reproduce a musical tone. In the printing operation of the synthetic image of the score sheet, for example, when a handwritten score manuscript is inputted by the image scanner, the original image 3 presents the score manuscript as it is, while the synthetic image 4 presents a shaped score text reconstructed by using the internal fonts of the symbols. Consequently, the synthetic image 4 is reproduced in the form of a clean copy of the original score manuscript. Thus, the printing operation is executed to print out the clean soft copy of the displayed synthetic image.

Scaling operation of the original and synthetic images 3, 4 can be conducted by selecting "Region" from the menu bar 1. Expansion scaling is undertaken to closely display a detail of the score in an expanded or enlarged form. Otherwise, reduction scaling is undertaken to display an overall view of the score. In practice, the mouse implement is actuated to move the cursor to the "Region" in the menu bar 1, and is then the mouse button is depressed to thereby call a pull-down menu of "Scale-up" and "Scale-down". The cursor is subsequently moved to "Scale-up" while the mouse button is held in the depressed state, and is then the mouse button is released to thereby select "Scale-up". Otherwise, the cursor is moved to "Scale-down" while the mouse button is held in the depressed state, and is then the mouse button is released to thereby select "Scale-down". The pull-down menu disappears from the screen when either of "Scale-up" and "Scale-down" is selected. When the "Scale-up" is selected, both of the original and synthetic images are displayed in an expanded form by a magnification rate of four times. When the "Scale-down" is selected, both of the original and the synthetic images are displayed in a reduced form by a magnification rate of ¼.

Figure 2:
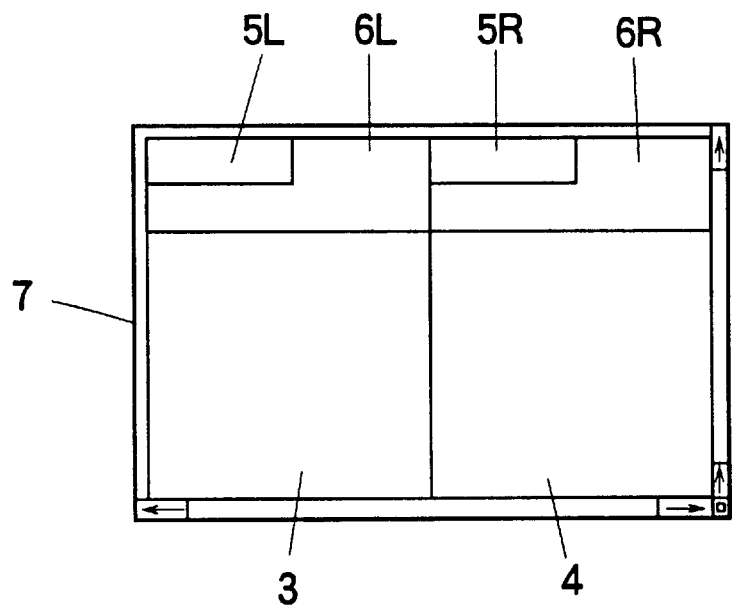
FIG. 2 is an illustrative diagram showing a target region of the score which is to be displayed in an expanded form.

Referring to FIG. 2, the score image can be scaled up within a target region. As mentioned before, the menu of "Scan" is selected to read the score by the image scanner so that the original image 3 is displayed in the window 7. Then, the menu of "Recognition" is selected to recognize score elements based on the original image data so that the reproduced synthetic image 4 is displayed in the window 7 in parallel to the original image 3 side to side. On the initial screen, a whole of the original image 3 and the synthetic image 4 is viewed in the display. When the menu of "Region" is selected and subsequently the pull-down menu of "Scale-up" is selected, a part of the original image 3 within a region 6L is enlarged by the magnification rate of four times. Concurrently, a corresponding part of the synthetic image 4 within a region 6R is also enlarged by four times. When the menu of "Scale-up" is further selected when the pair of the enlarged score images are displayed, a smaller part of the original image 3 within a region 5L is enlarged by 16 times. Concurrently, a corresponding smaller part of the synthetic image 4 within a region 5R is also enlarged by 16 times. By such a scaling operation, the pair of the original and the synthetic images 3, 4 are concurrently scaled up in the screen.

Figure 3:
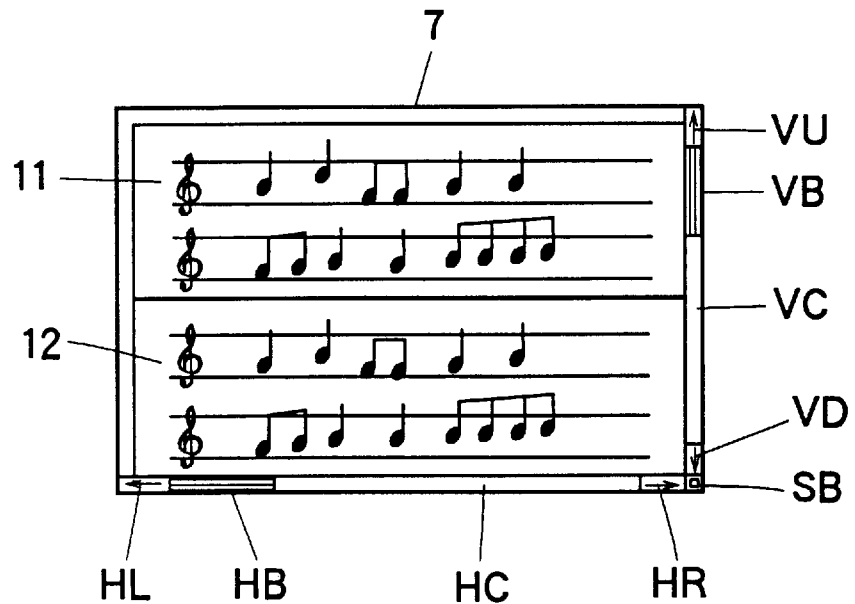
FIG. 3 is a schematic diagram showing a display window in which the expanded score is displayed by a magnification of four times.

Referring to FIG. 3, the score images enlarged by a magnification rate, i.e., factor of four times as the original are displayed in a window. When the menu of "Scale-up" is selected, a pair of an original image 11 and a synthetic image 12 which are enlarged by four times are displayed within the window 7 in parallel to each other in top and bottom positions. In the initial screen, the window is split into a pair of longitudinal areas where the respective original and synthetic images are displayed left and right sides. In the scaled screen, the window 7 is split into a pair of transverse areas where corresponding parts of the original and synthetic images 11, 12 are displayed in top and bottom. Consequently, the enlarged images can be well viewed. Further, the whole area of the display window can be efficiently utilized to thereby facilitate comparison of the original and synthetic images.

In the enlarged state, only a part of the score sheet is viewed as the original and synthetic images 11, 12. Therefore, scrolling operation of the images 11, 12 can be carried out to display every part of the score sheet. In detail, when the cursor is moved to a vertical scroll arrow VU and then the mouse button is clicked, the pair of the original and synthetic images 11, 12 are concurrently scrolled downward by a small pitch. When another vertical scroll arrow VD is addressed by the cursor upon click of the mouse implement, the original and synthetic images 11, 12 are concurrently scrolled upward by a small pitch. When a horizontal scroll arrow HL is addressed, the images 11, 12 are concurrently scrolled or panned rightward by a small pitch. By addressing another horizontal scroll arrow HR, the images 11, 12 are synchronously scrolled leftward at a small pitch. When the cursor addresses a vertical scroll bar VC at a portion upper than a scroll box VB, the pair of the original image 11 and the synthetic image 12 are simultaneously scrolled downward at a great pitch. On the other hand, when the scroll bar VC is addressed at a portion lower than the scroll box VB, the original and synthetic images 11, 12 are synchronously scrolled upward at a great pitch. When a horizontal scroll bar HC is addressed at a portion leftward of a scroll box HB, the original and synthetic images 11, 12 are concurrently scrolled or panned rightward at a great pitch. On the other hand, when the horizontal scroll bar HC is addressed at a portion rightward of the scroll box HB, the original and synthetic images 11, 12 are scrolled leftward synchronously with each other at a great pitch. By such a scrolling or panning operation, the original image and the synthetic image are scanned synchronously with each other in the same direction at the same pitch to thereby facilitate the visual comparison of the original and synthetic images.

The scroll boxes VB, HB indicate a displayed part of the score image. In detail, a width of the scroll boxes VB, HB indicates a width of a displayed region cut out from the score. For example, when the entire portion of the score is displayed in the window, the respective width of the scroll boxes VB, HB is broaden to share a whole width of the scroll bars VC, HB. In turn, when the score image is scaled up to thereby reduce a target region of the image to be displayed, the width of the scroll boxes VB, HB is accordingly made small. A position of the scroll boxes VB, HB along the respective scroll bars VC, HC indicates a viewed section which is cut out from the score for the display. For example, when the scroll box VB is positioned at the topmost portion of the scroll bar VC, a topmost part of the score is viewed on the screen. In turn, when the scroll box VB is positioned at a lowermost part of the scroll bar VC, a last part of the score is viewed in the window. In similar manner, the horizontal scroll box HB indicates a horizontal position of the viewed part of the score. The cursor may be moved on the scroll box VB, then the cursor is moved downward while the mouse button is depressed, and lastly the mouse button is released. By such an operation, the original image 11 and the synthetic image 12 are concurrently shifted upward to thereby display a lower part of the score. On the other hand, when the cursor is moved upward while depressing the mouse button and then releasing the mouse button, the original and the synthetic images 11, 12 are concurrently shifted downward to thereby display an upper part of the score. In similar manner, the scroll box HB is drawn to scan the displayed image leftward or rightward.

A size box SB is graphically operated to change a size of the window 7. For example, the change of size is effected when a current display window is reduced to newly open another display window, or otherwise when the display window is enlarged. For changing the size of the display window, the cursor is moved to the size box SB involved in the open window, and then the cursor is moved to a right and bottom corner of a desired size while the mouse button is held in the depressed state. Then, the mouse button is released to effect the change of the window size. The same graphic operation is carried out to expand or reduce the window size. However, a maximum window size is fixed in the enlargement of the window. The cursor movement beyond a limit is unabled since the maximum size is fixed.

Figure 4:
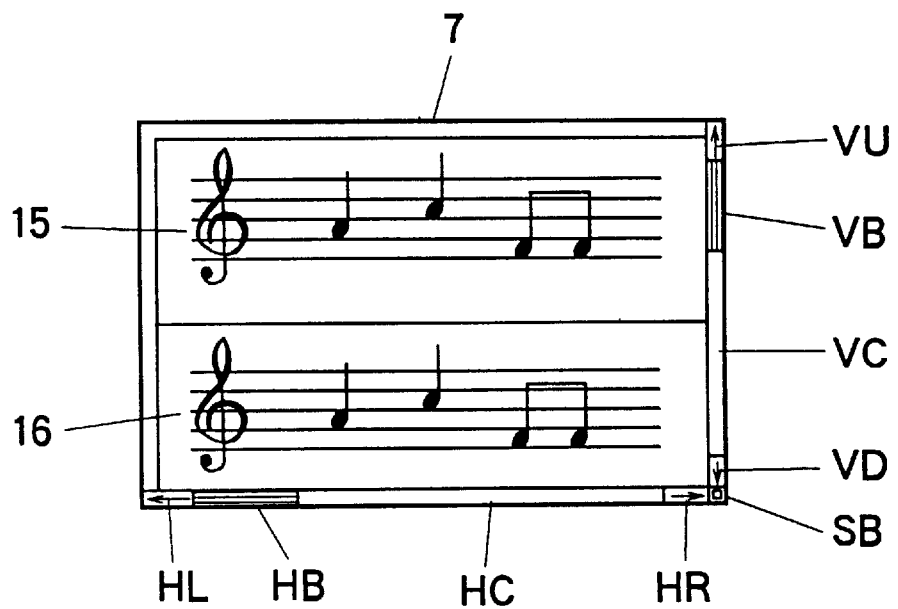
FIG. 4 is a schematic diagram showing a display window in which a further expanded score is displayed by a magnification of sixteen times.

Referring to FIG. 4, the display window presents the score image enlarged by 16 times as the original score image. When the menu of "Scale-up" is successively selected twice, the window 7 is switched to display a pair of an original image 15 and a synthetic image 16, which are enlarged by 16 times and which are vertically arranged in parallel to each other. An upper left part of the initial image is enlarged by 4times when "Scale-up" is executed once. The upper left part is enlarged further when "Scale-up" is executed once again. Thus, the pair of the original image 15 and the synthetic image 16 are expanded 16 times as great as the initial regular image. The scrolling of the enlarged image can be conducted likewise by graphic operation of the scroll arrows VU, VD, HL and HR, the scroll bars VC and HC, or the scroll boxes VB and HB. The size changing of the display window 7 is carried out by the graphic operation of the size box SB.

Figure 5:
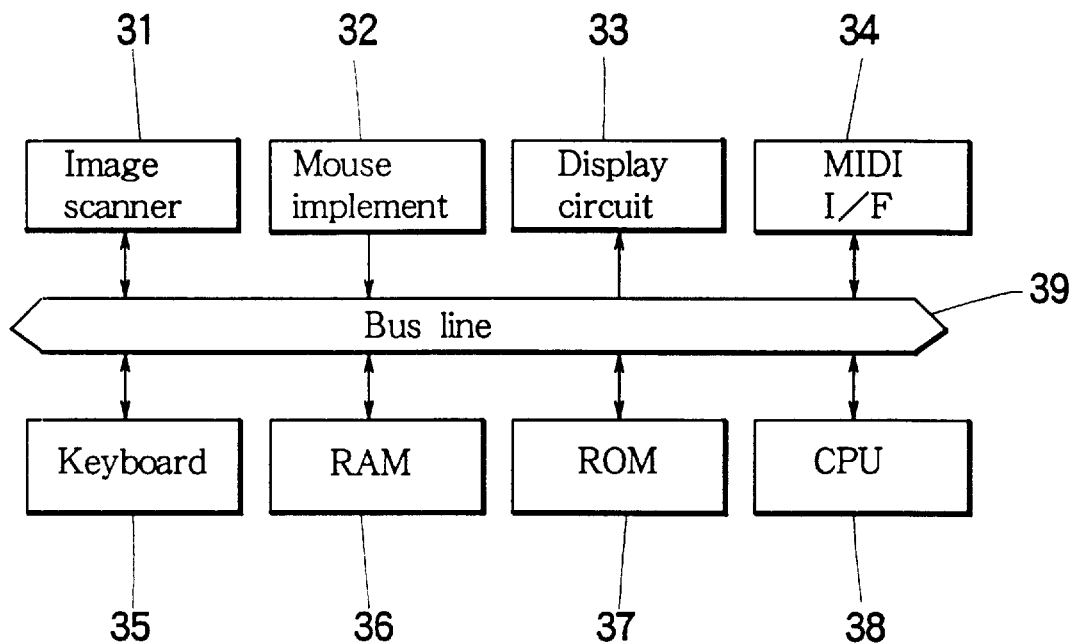
FIG. 5 is a block diagram showing a first embodiment of the inventive score recognition apparatus.

Referring to FIG. 5, the first embodiment of the musical score recognition apparatus is comprised of a CPU 38 which controls an image scanner 31 through a bus line 39 to read the score sheet. The image scanner 31 produces an image data of the score sheet. A RAM 36 receives the read image data through the bus line 39 to store the same as an original image data. The image scanner 31 may have a resolution in the order of 300 dpi. The CPU 38 executes the recognition process of score elements based on the original image data of the score to produce a score data. The CPU 38 further produces a synthetic image data according to the score data. Moreover, the CPU 38 forms a MIDI data according to the score data. Those of the score data, synthetic image data and MIDI data are also stored in the RAM 36. The MIDI data is transferred from the RAM 36 to an external audio device through a MIDI interface 34 and the bus line 39. Otherwise, the external audio device may input a MIDI data into the MIDI interface 34, which is then stored in the RAM 36 through the bus line 39. A display circuit 33 receives the image data from the RAM 36 through the bus line 39 to visually present an image of the score. In such a case, the synthetic image of the score is reconstructed by using fonts of musical score symbols stored in a ROM 37. A mouse implement 32 is utilized to input an operation command effective to command selection of various operation menus and to command screen operations in association with the display circuit 33. A keyboard 35 is utilized to input another operation command effective to command movement of a cursor, and effective to input characters or else. The ROM 37 also memorizes a computation program. The CPU 38 operates based on the computation program to execute various operations and processes with using working memories such as registers and buffers provided in the RAM 36.

Figure 6:
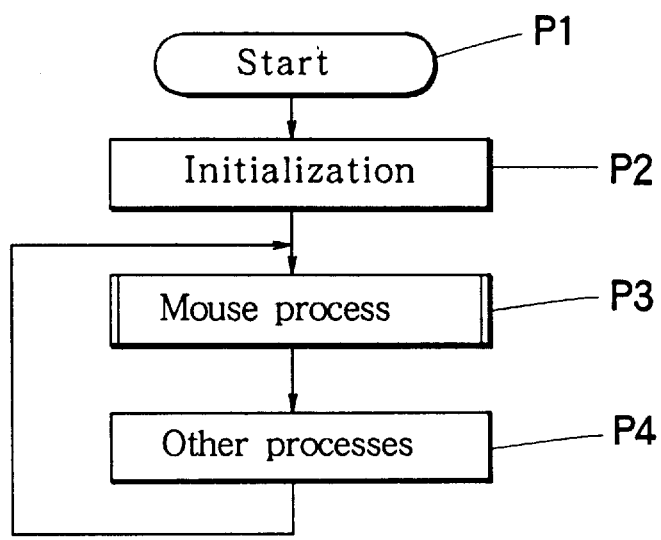
FIG. 6 is a flowchart showing a main routine of a screen operation of the score recognition apparatus.

Referring to FIG. 6, the CPU 38 executes a main routine for displaying of the score recognition results. The main routine starts from Step P1, and then initialization of registers and else is carried out in Step P2. Subsequently, Step P3 is undertaken to execute a mouse process in response to inputs from the mouse implement. Lastly, Step P4 is undertaken to execute other processes such as a keyboard process in response to an operation command inputted by the keyboard. Thereafter, the routine returns to Step P3 to thereby repeatedly carry out the above noted processes.

Figure 7:
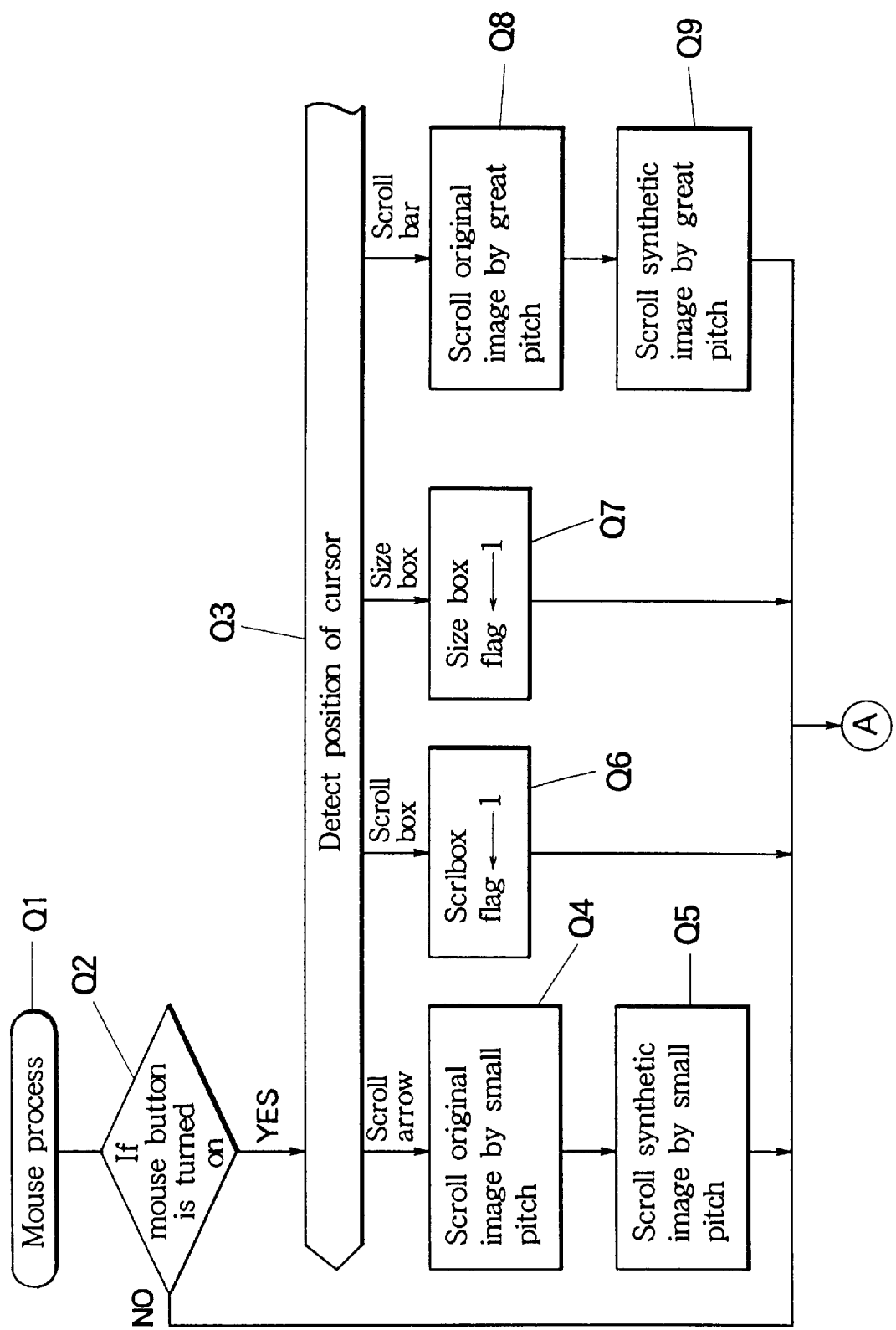
FIG. 7 is a flowchart showing a mouse process involved in Step P3 of the main routine.

Referring to FIG. 7, the mouse process of Step P3 shown in the flowchart of FIG. 6 is executed as follows. After the mouse process is called in Step Q1, subsequent Step Q2 is undertaken to check as to if the mouse button is depressed into a switch-on state. If Yes, Step Q3 is undertaken to detect a position of the cursor when the mouse button is depressed. On the other hand, if the mouse button is out of the switch-on state, the routine directly proceeds to a junction terminal A. In Step Q3, judgement is made as to where the cursor is positioned on the screen when the mouse button is depressed. The routine divides into different routes dependently on the detected position of the cursor. The mouse process includes screen operations as shown in FIG. 7, and menu selections as shown in a next flowchart of FIG. 8. With regard to some part of the mouse process, description is given as a whole from switch-on to switch-off. The screen operations are executed by means of the graphic symbols such as the scroll arrows, scroll boxes, size boxes and scroll bars. On the other hand, the menu selections are conducted by means of various menu items such as "Region", "Scan", "Recognition" and "Others".

When a scroll arrow is addressed by the cursor when the mouse button is depressed, the routine proceeds from Step Q3 to Step Q4 where the displayed original image is scrolled at a small pitch within the display window. If a vertical scroll arrow is addressed, the scrolling is effected upward or downward. If a horizontal scroll arrow is addressed, the scrolling is effected leftward or rightward. The scrolling is carried out at a relatively small pitch such that one pitch is determined as 1/10 of the window size. The window displays a binarized image of white and black, which is latched in a frame memory provided within the display circuit. For example, when the original image is scrolled, a sectional region is successively cut out from the original image data read by the image scanner, and the cut region is successively copied into the frame memory. Consequently, the original image is viewed in the window in the scrolled state. Subsequently in Step Q5, the synthetic image is scrolled at a small pitch. In manner similar to the scrolling of the original image, the synthetic image is scrolled upward or downward, and leftward or rightward in response to the position of the cursor. The synthetic image is scrolled synchronously with the scrolling of the original image so that the original and synthetic images are shifted in the same direction at the same pitch. Thereafter, the routine proceeds to the junction terminal A.

If the cursor is positioned at a scroll bar when the mouse button is depressed, the routine proceeds from Step Q3 to Step Q8 where the original image is scrolled at a great pitch. If a vertical scroll bar is addressed, the scrolling is effected upward or downward. If a horizontal scroll bar is addressed, the scrolling is effected leftward or rightward. The great pitch may be set to 1/4 of the window size. Subsequently in Step Q9, the synthetic image is scrolled at the same great pitch within the display window. In manner similar to the scrolling of the original image, the synthetic image is scrolled upward or downward, and leftward or rightward dependently on the position of the cursor. The synthetic image is scrolled synchronously with the original image in the same direction at the same distance. Thereafter, the routine advances to the terminal A.

If a scroll box is pointed by the cursor when the mouse button is depressed in Step Q3, subsequent Step Q6 is undertaken to set a flag Scrlbox with "1". The scroll box is utilized to conduct free scrolling of the displayed image. Thereafter, the routine proceeds to the terminal A to follow the movement of the cursor.

If a size box is pointed by the cursor when the mouse button is depressed in Step Q3, subsequently Step Q7 is undertaken to set a flag Sizebox with "1". The size box is utilized to change the window size. Thereafter, the routine advances to the terminal A to follow the movement of the cursor.

Figure 8:
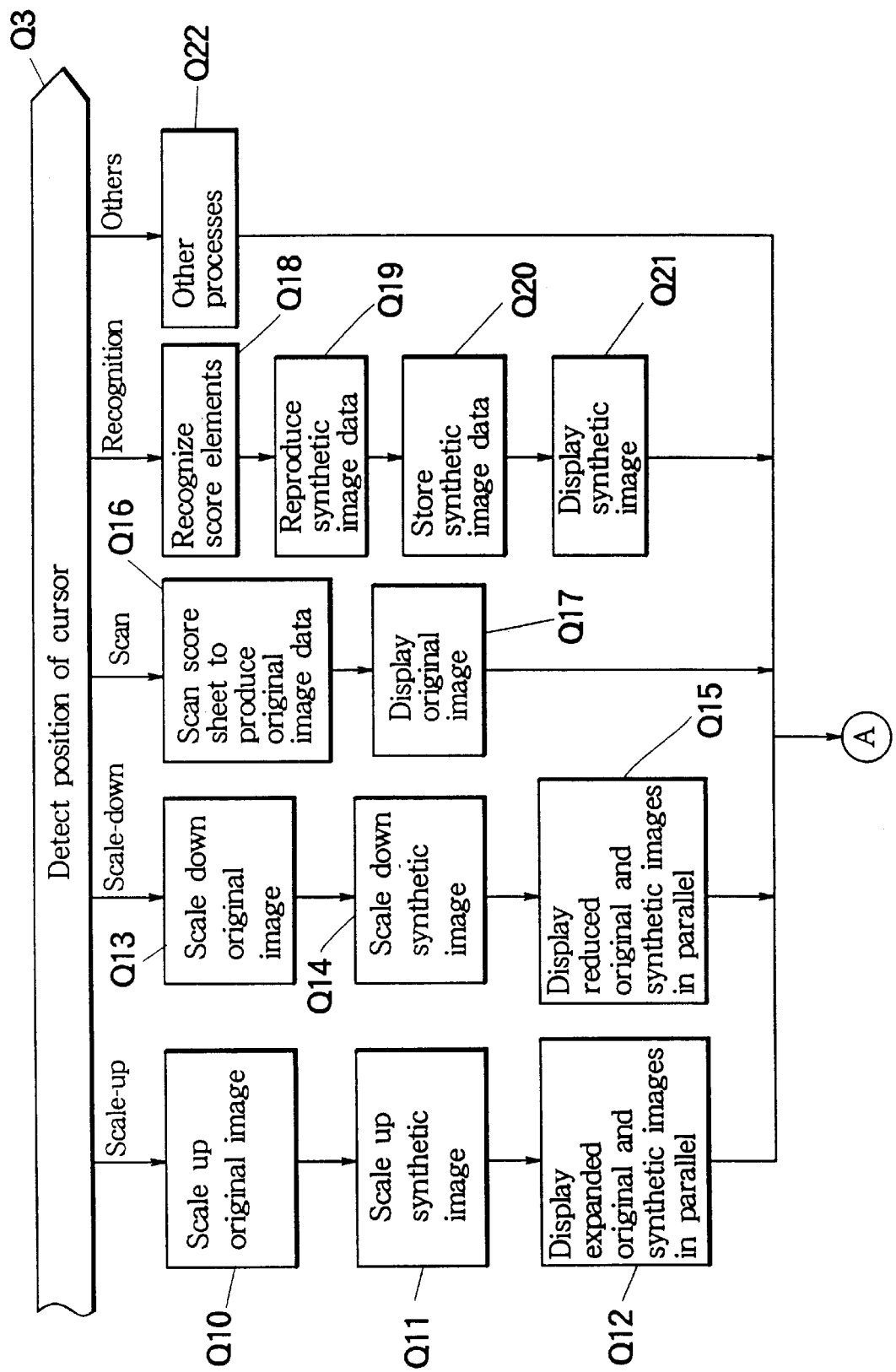
FIG. 8 is a flowchart likewise showing the mouse process executed in Step P3 of the main routine.

Referring to FIG. 8, the description is given to the process where the cursor is positioned at menu items in Step Q3. The menu includes various items such as "Region", "Scan", "Recognition" and "Others". Further, the menu of "Region" has a pull-down menu or submenu of "Scale-up" and "Scale-down". If the cursor points "Region" when the mouse button is depressed in Step Q3, the pull-down menu is displayed, which contains a pair of submenues "Scale-up" and "Scale-down". If the cursor points the submenu of "Scale-up" upon release of the mouse button, Step Q10 is undertaken to cut out a region from the original image data to generate an expanded image data of the region. The expanded image data is produced by enlarging the region, which is a quarter part of the original image data, at a magnification rate of 4 times. In subsequent Step Q11, another expanded image data of the synthetic image is produced in manner similar to the expansion of the original image. The expanded image data is produced by enlarging a quarter region of the synthetic image data at the magnification rate of 4 times. Then, Step Q12 is undertaken to display the pair of the original and synthetic images within the window in a pair of vertically or horizontally split areas, dependently on scaling rate of the image. Thereafter, the routine advances to the terminal A. Initially, the window displays the pair of the original image and the synthetic image at a longitudinal size which covers the whole of the score sheet. The longitudinal original and synthetic images are displayed in respective vertical split areas of the window. Each vertical split area covers the whole of the score sheet, and contains a regular size of the score image. When the scale-up operation is carried out in the initial state where the regular size of the original and synthetic images are displayed, the display window is switched from the vertical split form to a horizontal split form such that the pair of enlarged original and synthetic images are displayed in respective horizontal split areas of the window. Stated otherwise, the enlarged original and synthetic images are arranged in parallel to each other in top and bottom. When the scale-up operation is applied to the already enlarged images of the score, twice enlarged forms of the original and synthetic images are displayed in the same horizontal split areas in a top and bottom arrangement.

In Step Q3, if the cursor points "Region" upon depression of the mouse button, the pull-down menu is displayed as mentioned before. Subsequently, if the cursor points the submenu "Scale-down" upon release of the mouse button, the routine proceeds to Step Q13. In this step, a cut region of the original image data is expanded, and then the expanded data region is processed to produce a reduced image data. The reduced image data is formed by scaling down the expanded data region which is four times as large as the data region of the currently displayed original image, by the magnification rate of ¼. Subsequently, in Step Q14, a reduced image data of the synthetic image is produced in manner similar to the scale-down operation of the original image. The reduced image data is produced by reducing an expanded data region which is four times as large as the data region of the currently displayed synthetic image, by the magnification rate of ¼. In Step Q15, the pair of the reduced original and synthetic images are displayed in the vertical or horizontal split areas of the window dependently on the reduction rate of the displayed image. Thereafter, the routine proceeds to the terminal A. If the reduced score image is made identical to the regular size of the score image, the display window is switched from the horizontal split form to the vertical split form to display the pair of the reduced original and synthetic images in the respective vertical split areas. Consequently, the reduced original and synthetic images are arranged in parallel to each other on left and right.

If the cursor points "Scan" upon clicking of the mouse button in Step Q3, subsequently Step Q16 is undertaken. In this step, the CPU sends a reading start command to the image scanner. The image data of the score read by the image scanner is stored into the RAM. In subsequent Step Q17, the original image data of the score stored in the RAM is transferred to the frame memory of the display circuit to thereby visually present a whole of the score sheet in the regular size within the left half area of the window which is vertically split. Thereafter, the routine advances to the terminal A.

If the cursor points "Recognition" upon clicking of the mouse button in Step Q3, subsequent Step Q18 is undertaken. In this step, the original image data stored in the RAM is analyzed to recognize therefrom kinds and positions of score elements such as staff lines, notes and other symbols. In Step Q19, the synthetic image data is produced according to the code data and the position data of the recognized score element by using internal fonts to thereby reconstruct a synthetic image corresponding to the original image of the score. In Step Q20, the produced synthetic image data is stored in the RAM. In Step Q21, the synthetic image data is transferred from the RAM to the frame memory to thereby display the synthetic image of the whole score sheet in the regular size in the right half area of the display window, which is vertically split. Thereafter, the routine proceeds to the terminal A.

If the mouse button is clicked when the cursor is positioned in an area other than the above described window symbols and the menu items, Step Q22 is undertaken to carry out other menu operations such as "File", "Edit" and "Others". Thereafter, the routine proceeds to the terminal A. For example, when the menu of "File" is addressed, filing operation is carried out such as to delete or copy files of the image data or the MIDI data according to a subsequent operation command inputted by means of the mouse implement or the keyboard. If the menu of "Edit" is addressed, editing operation is carried graphically on the displayed synthetic image according to subsequently inputted operation commands so as to effect addition, deletion or alteration of score elements. If the menu of "Others" is addressed, submenu items such as "Automatic performance" and "Score print" are displayed for selection. If "Automatic performance" is selected, the MIDI data or else produced by the score recognition is fed to an external audio device through the MIDI interface. If "Score print" is selected, the synthetic image data is fed to an external printing machine to print out the score.

Figure 9:
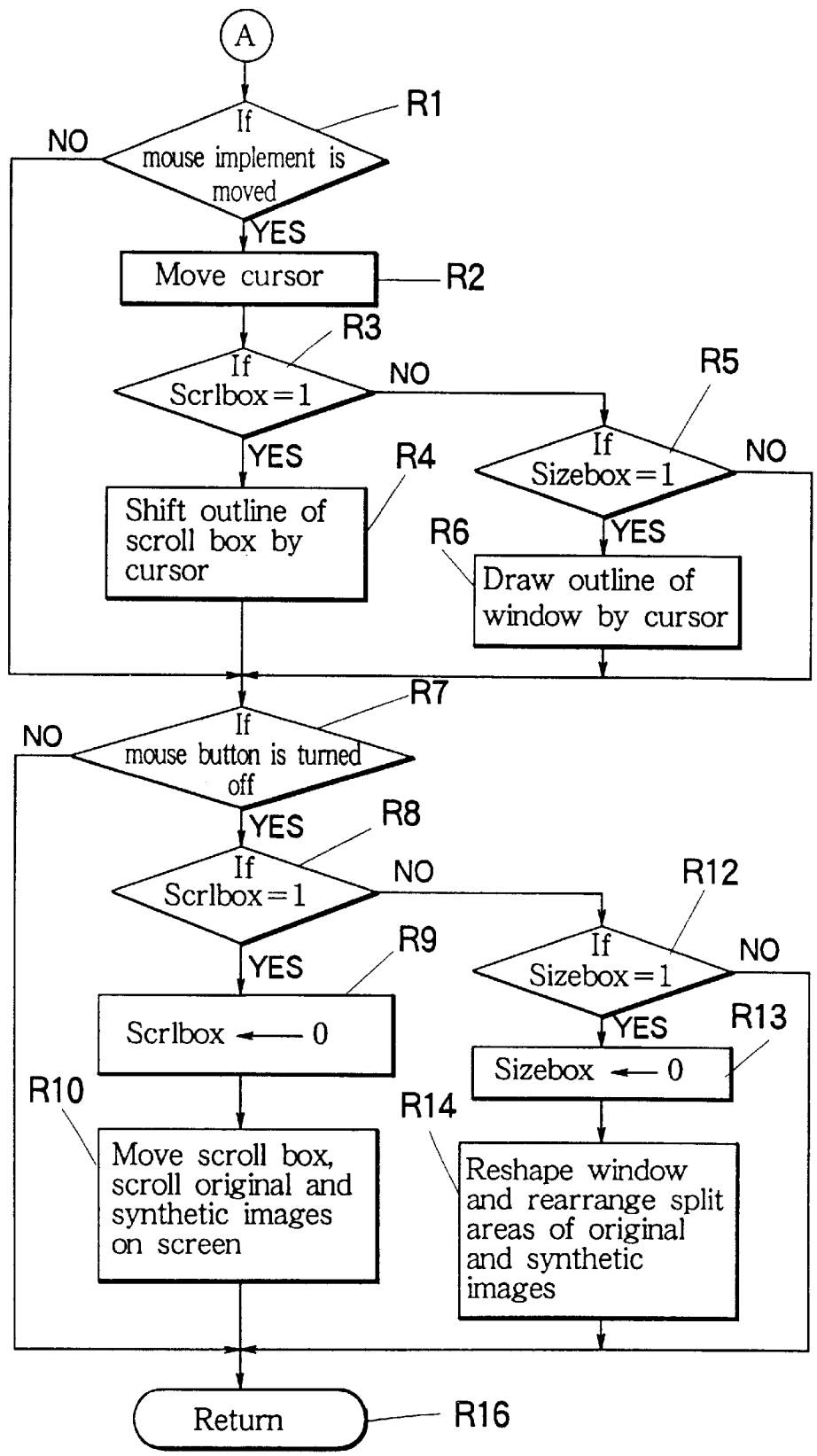
FIG. 9 is a flowchart showing a process subsequent to a routine terminal A of the mouse process shown in FIGS. 7 and 8.

Referring to FIG. 9, the mouse process advances from the terminal A to Step R1 where check is made as to if the mouse implement is moved. If Yes, subsequent Step R2 is undertaken. If No, the routine is bypassed to Step R7. In Step R2, the cursor is displaced on the screen in response to the movement of the mouse implement. Subsequent Step R3 is undertaken to check as to if the flag Scrlbox is set with "1". If the flag Scrlbox does not indicated "1", Step R5 is undertaken. If the flag Scrlbox indicates "1", Step R4 is undertaken. In Step R4, an outline of the scroll box is shifted correspondingly to the moving direction and moving distance of the cursor. If the cursor is positioned at the vertical scroll box, the outline thereof is vertically displaced in response to the movement of the cursor. If the cursor is positioned at the horizontal scroll box, the outline thereof is horizontally displaced in response to the movement of the cursor. Thereafter, the routine proceeds to Step R7.

In Step R5, check is made as to if the flag Sizebox is set with "1". If No, Step R7 is undertaken. If Yes, Step R6 is selected. In Step R6, an outline of a lower right corner of the window is drawn or displaced correspondingly to the moving direction and moving distance of the cursor, to thereby change an outline size of the display window. In response to the operation of the mouse implement, coordinate values representative of the lower right corner of a rectangular figure, i.e., the outline of the window is changed as pointed by the moved cursor to thereby change the size of the display window and to display the outline thereof. Thereafter, Step R7 is undertaken.

In Step R7, check is made as to if the mouse button is released so as to detect the state of the mouse button. If not the off-state, Step R16 is undertaken to thereby return to the main routine. If the mouse button is placed in the off-state, subsequent Step R8 is undertaken. In Step R8, check is made as to if the flag Scrlbox is set with "1". If the flag Scrlbox does not indicate "1", the routine branches to Step R12. If the flag Scrlbox indicates "1", subsequent Step R9 is undertaken. In Step R9, the flag Scrlbox is reset to "0", thereby advancing to Step R10. In Step R10, a body of the scroll box is displaced to the outline thereof. Then, according to the position of the outline of the scroll box fixed upon the release of the mouse button, a display region cut out from the original image data is shifted to scroll the original image within the window. Further, in similar to the scrolling of the original image, the display region of the synthetic image data is shifted according to the position of the outline of the scroll box to thereby effect the scrolling of the synthetic image. Thereafter, Step R16 is undertaken to return to the main routine.

In Step R12, check is made as to if the flag Sizebox is set with "1". If the flag Sizebox does not indicate "1", Step R16 is undertaken to return to the main routine. If the flag Sizebox indicates "1", subsequent Step R13 is undertaken. In Step R13, the flag Sizebox is reset to "0", thereby proceeding to Step R14. In this step, a body of the rectangular window is changed in registration with the outline thereof which is fixed upon release of the mouse button. Then, the one of the split areas, which contains the original image is reshaped in conformity with the changed size and shape of the window. Further, the other of the split areas, which contains the synthetic image is also reshaped in parallel to the one split area. Lastly, Step R16 is undertaken to return to the main routine.

Figure 10:
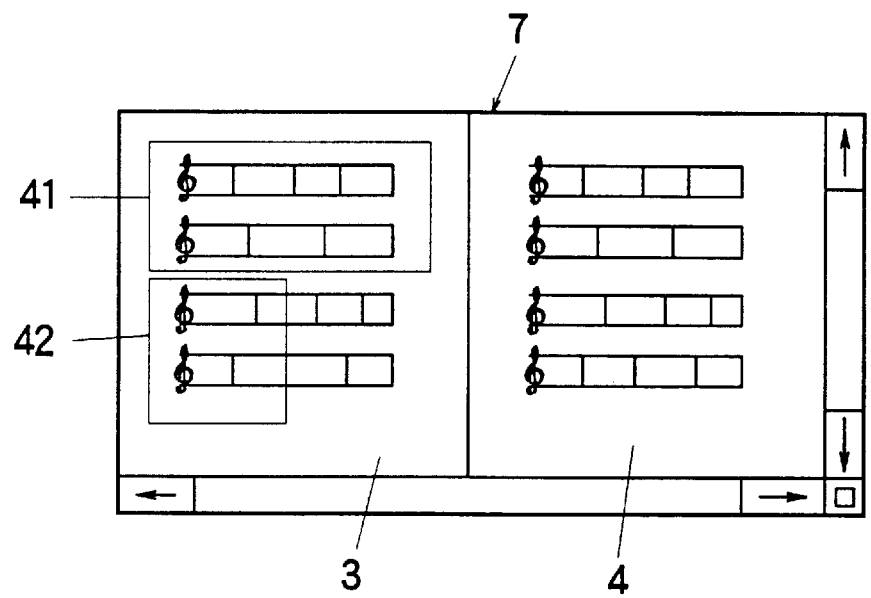
FIG. 10 is an illustrative diagram showing a variation of the first embodiment.

Referring to FIG. 10, the display region of the score image can be changed as follows in different manner than the above described modes in the present embodiment. In the previous modes, the score image is suitably scaled up and down to change the viewed region of the score image. In an additional mode, a size and shape of the area covering the viewed region of the score image is suitably designated commonly for both of the original image 3 and the synthetic image 4 of the same score. The figure exemplifies different areas 41, 42 drawn on the original image 3. Each of the areas 41, 42 is drawn in a rectangular shape. In the drawing operation, first the cursor is moved to an upper left corner of a rectangular area to be drawn. Then, the mouse implement is operated while the mouse button is held in the depressed state to move the cursor to a lower right corner of the rectangular area. Lastly, the mouse button is released to fix the rectangular area. Namely, a coordinate of the left upper corner of the rectangular area is set at a position where the mouse button is depressed. Another coordinate of the right lower corner of the rectangular area is set at another position where the mouse button is released. By such a sizing operation, the size and shape of the rectangular area is designated by drawing a desired diagonal line from the left upper corner to the right lower corner.

Figure 11:
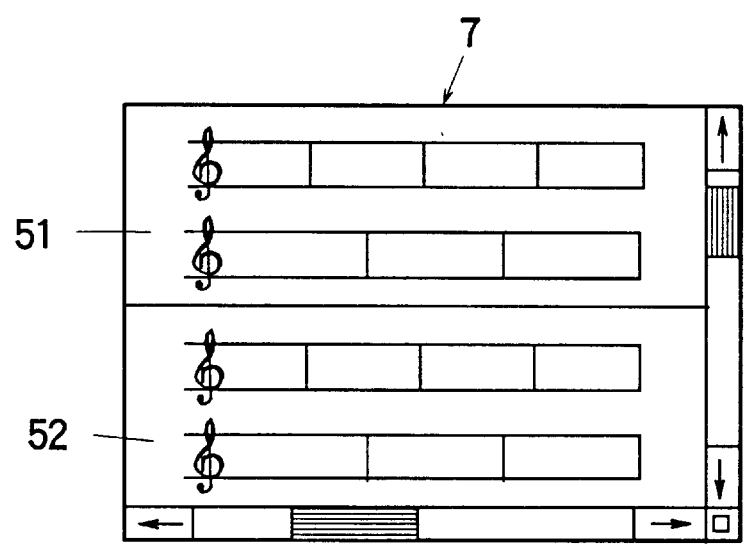
FIG. 11 is an illustrative diagram showing a display arrangement of original and synthetic images when transverse split window areas are designated in the FIG. 10 variation.

Referring to FIG. 11, the window 7 is horizontally split when the transverse rectangular area 41 is designated as shown in FIG. 10. The rectangular area 41 has the transverse size and shape so that the display window 7 is horizontally split to display an original image segment 51 and a corresponding synthetic image segment 52 in parallel to each other at top and bottom. Further, the window size is automatically adjusted to conform to the pair of the split areas into which the original and synthetic image segments 51, 52 are fitted, respectively.

Figure 12:
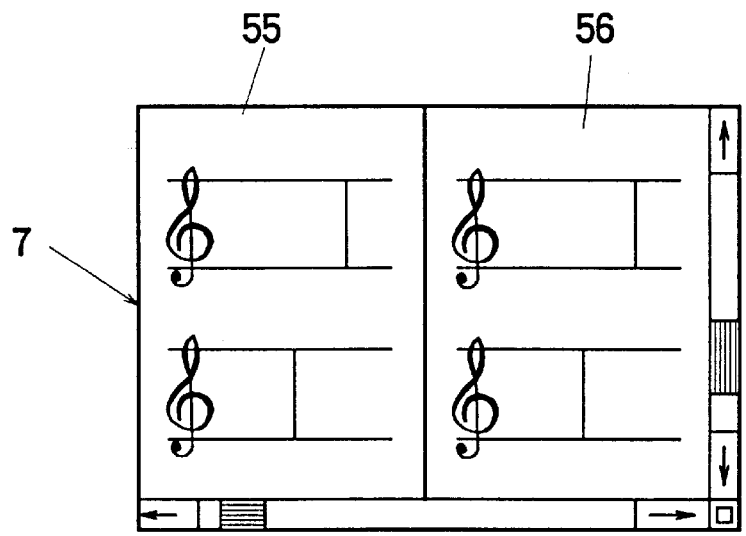
FIG. 12 is an illustrative diagram showing a display arrangement of the original and synthetic images when longitudinal split window areas are designated in the FIG. 10 variation.

Referring to FIG. 12, the window 7 is vertically split when the longitudinal rectangular area 42 is designated as shown in FIG. 10. The rectangular area has the longitudinal size and shape so that the display window 7 is vertically divided into a pair of split areas to display an original image segment 55 and a synthetic image segment 56 in parallel to each other at an optimized arrangement of left and right. Further, the window size is automatically adjusted to conform to the pair of split areas into which the original image segment 55 and the synthetic image segment 56 are fitted, respectively.

As described above, the optimized vertical or horizontal splitting is determined according to the size and shape of the drawn rectangular area. Additionally, a size and shape of the display screen is also considered in the optimum arrangement of the split areas. An aspect ratio of the designated rectangular area is calculated so that the window is split into top and bottom for the transverse rectangular area, or otherwise the window is split into left and right for the longitudinal rectangular area. Further, the window is reshaped to minimize a margin of the screen according to the aspect ratio thereof. By such an operation, the display screen is efficiently utilized, and the pair of the original and synthetic images are viewed in parallel to thereby facilitate the visual comparison. The image segment displayed in the designated area may have the same scaling as that of the initial image. Otherwise, the image segment may be scaled up or down according to the size of the designated rectangular area.

As described above, according to the first aspect of the present invention, the musical score recognition apparatus reads the original image, and recognizes the same to produce the synthetic image on a corresponding score format. The original and synthetic images are displayed vertically or horizontally in parallel to each other depending on the graphic screen operation to thereby facilitate the visual comparison between the original image data representative of the inputted score and the synthetic image data representative of the recognition results. If a recognition error is found as the results of the comparison between the original and synthetic images, editing operation can be carried out graphically on the display screen such as to delete, add or alter the score elements. The scrolling operation is carried out such that the viewed regions of the original and synthetic images are scanned concurrently with each other. Further, the scaling operation is carried out in parallel manner such that the viewed regions of the original and synthetic images are scaled up or down in the same magnification rate, and are cut out from the same section of the score. Consequently, the window displays the corresponding segments of the original image and the synthetic image while the screen operations such as scrolling, scaling and sizing are applied to the displayed image, thereby facilitating the comparison of the original and synthetic images . Though the invention is described in conjunction with the disclosed first embodiment, the invention is not limited thereto but may include various modifications, improvements and combinations.

Figure 14:
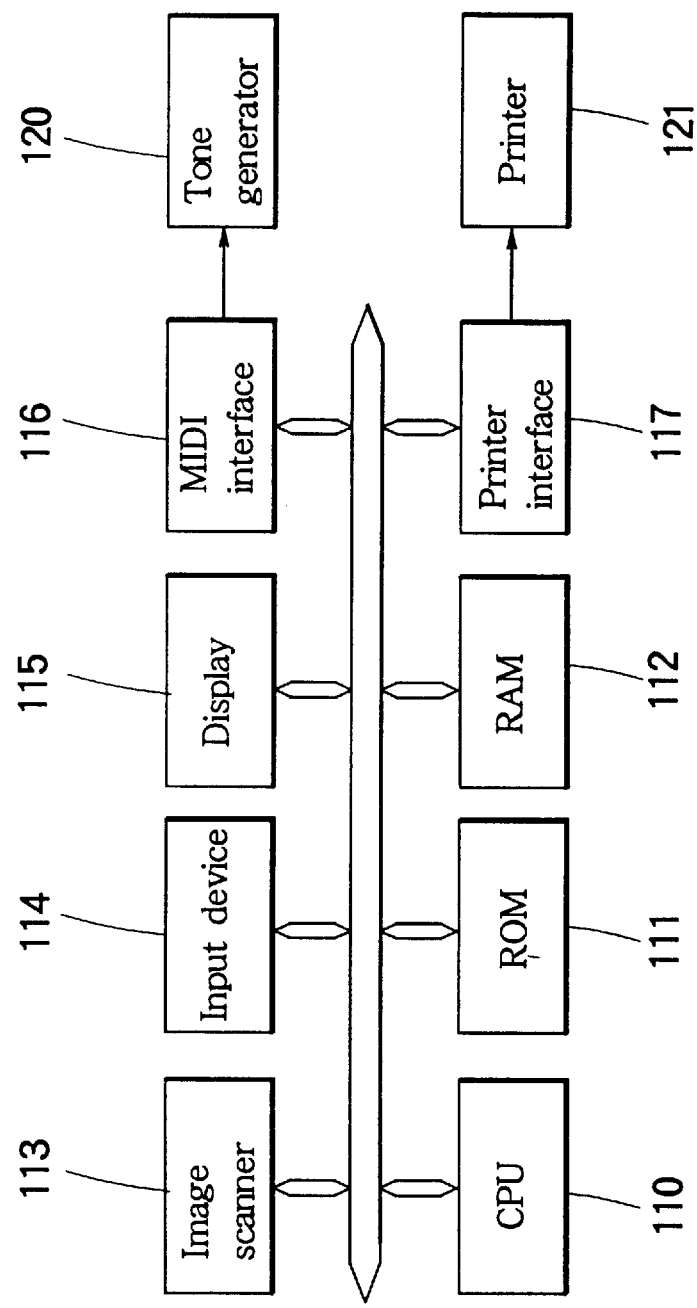
FIG. 14 is a block diagram showing a second embodiment of the inventive score recognition apparatus.

Referring to FIG. 14, a second embodiment of the inventive score recognition apparatus is provided with an image scanner 113 for reading an image data of a given score (i.e., the original image data). The apparatus analyzes the original image data to recognize therefrom contents of the score, and further produces a print data composed of a font arrangement (i.e., the synthetic image data) and a MIDI data for use in the automatic performance according to the recognized contents of the score. A CPU 110 is connected through a bus line to those of ROM 111, RAM 112, image scanner 113, input device 114, display unit 115, MIDI interface 116 and printer interface 117. The ROM 111 stores various programs for controlling the operation of the apparatus, and stores font data for use in displaying of the synthetic image of the score and printing of the score sheet. The fonts are discriminated by codes assigned to various score symbols such as notes and rests. The RAM 112 is provided with various memory areas such as an original image data memory area for storing the original image data inputted by the image scanner 113, a score data memory area for storing a score data which is formed by recognizing and interpreting the symbols contained in the original image data, a synthetic image data memory area for storing the synthetic image data which is reconstructed based on the score data with using the font data to reproduce the score, and a discrepancy portion image data memory area for storing a discrepancy portion image data representative of a discrepancy portion between the original and synthetic images. The synthetic image is reconstructed on staff lines having the same interval as those of the original image, and the score symbols are arranged correspondingly to those of the original image. Consequently, the discrepancy portion image includes only incorrectly recognized symbols and precludes correctly recognized symbols, because the synthetic and original images coincide with each other as long as the recognition is correctly executed. As described before, the image scanner 113 is used for inputting the original image of the score. The image scanner 113 optically reads contents of the score to input the original image data in a bit map form. The input device 114 is comprised of a mouse implement, a keyboard and else which are used to input an operation command and a data during the course of editing the score data or other graphic operations. Namely, the mouse implement and the keyboard are manipulated to carry out editing works on the display screen, such as deletion of unnecessary elements of the synthetic image and addition of necessary elements to the synthetic image. The score data is corrected as well as the synthetic image data in response to the deletion and addition work on the display screen. The display unit 115 is comprised of a CRT or else having a display screen which visually presents the original image, the synthetic image and else. The MIDI interface 116 connects to a tone generator 120 which generates musical tones based on the inputted MIDI data. The score recognition apparatus produces the automatic performance data (i.e., MIDI data) according to the score data, and feeds the MIDI data to the tone generator 120 through the MIDI interface 116 to thereby effect the automatic performance of a music composition prescribed in the score sheet. The printer interface 117 connects to a printer 121 which receives the synthetic image data to print out the reconstructed score.

Figure 15:
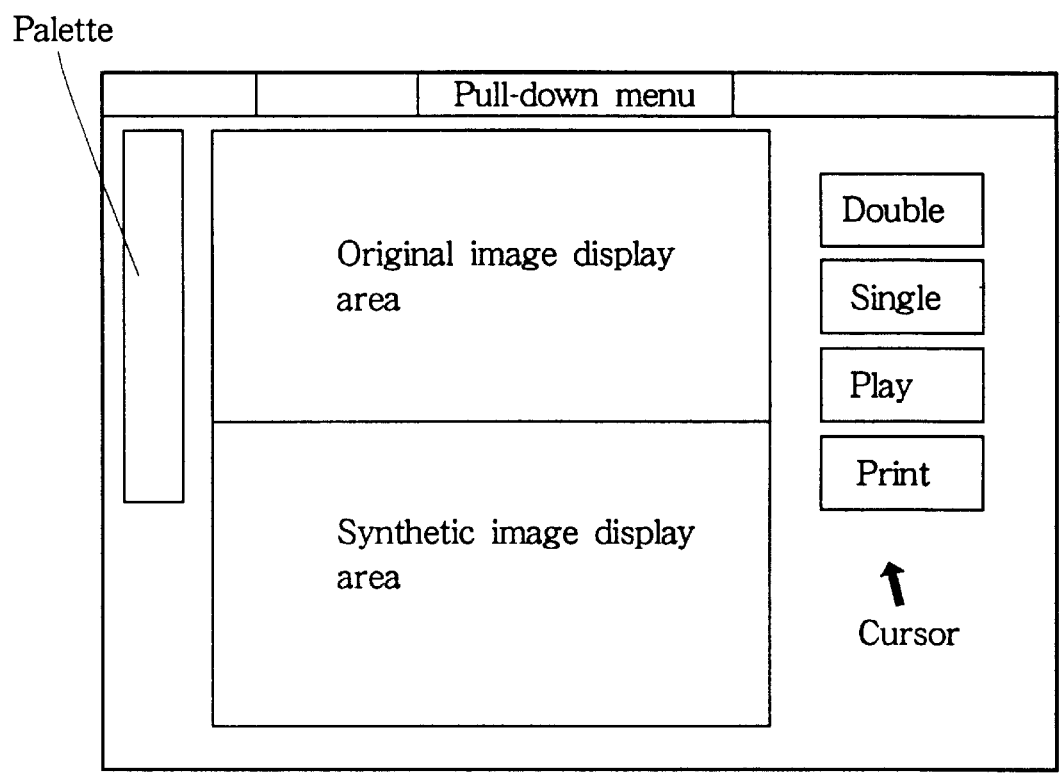
FIG. 15 is a schematic diagram showing a display screen layout of the FIG. 14 score recognition apparatus.

Referring to FIG. 15, the display unit 115 has the screen divided into various sections or areas. The screen contains various items of pull-down menu at a top section. The mouse implement is manually moved to select a desired item of the pull-down menu by means of a cursor so that a corresponding menu display is developed downward of the selected item. the user further actuates the mouse implement to access the menu display to select and execute various operations.

A pair of an original image display area and a synthetic image display area are provided in a central section of the screen. The original image display area presents an original image which is provisionally made free of the staff lines, while the synthetic image display area presents a synthetic image which is likewise provisionally processed to erase therefrom the staff lines. In such a manner, the original image and the synthetic image are displayed in parallel to each other at top and bottom in a regular display mode. Additionally, in a double display mode, a discrepancy portion image is presented in the lower display area in superposed relation to the synthetic image. Further, in a single display mode, the discrepancy portion image alone is presented in the upper display area.

A palette is displayed along a left side section of the screen. The palette contains various symbols such as notes and rests which are utilized when the user edits the synthetic image. The user drags a desired item of the score symbols from the palette to a target spot of the synthetic image display area by means of the mouse implement so as to input the symbol into the synthetic image data. Concurrently, the score data which is a basis of the synthetic image data is corrected accordingly.

Further, the display screen contain at its right side section four button switches, i.e., a double mode button, a single mode button, a play button and a print button. These four button switches are selectively clicked by means of the mouse implement to execute corresponding operations. By turning on the double mode button, the discrepancy portion image is displayed in superposed relation to the synthetic image in the double display mode. In this case, the discrepancy portion image is displayed in a red color tone so as to visually discriminate from a background of the synthetic image having a black color tone. By turning on the single mode button, the discrepancy portion image is alone displayed in the upper display area in place of the original image. The user can conduct the graphic editing operation of the synthetic image displayed in the synthetic image display area to correct the score data in any of the regular display mode, the double display mode and the single display mode.

By turning on the play button, the score data is converted into the MIDI data, which is then sequentially fed to the tone generator 120 to effect the automatic performance of a music piece prescribed in the score sheet. In forming of the MIDI data from the score data, other symbols than the notes are not directly converted into the MIDI data. However, these additional symbols are indirectly reflected in an event of the MIDI data, which represents sounding or silencing of a musical tone. For example, if a multiple of notes are coupled by an additional symbol of tie, a total length of the multiple notes is written into the MIDI data as if a single note. Further, if a slur is added to a note, a full length of that note is written into the MIDI data as a tone duration of that note. If a staccato is added to a note, about a half length of that note is written into the MIDI data as a tone duration of that note. By turning on the print button, the synthetic image data constructed in the developed form of the font data is fed to the printer 121. The printer 121 prints the synthetic image to reproduce a copy of the score sheet.

Figure 16:
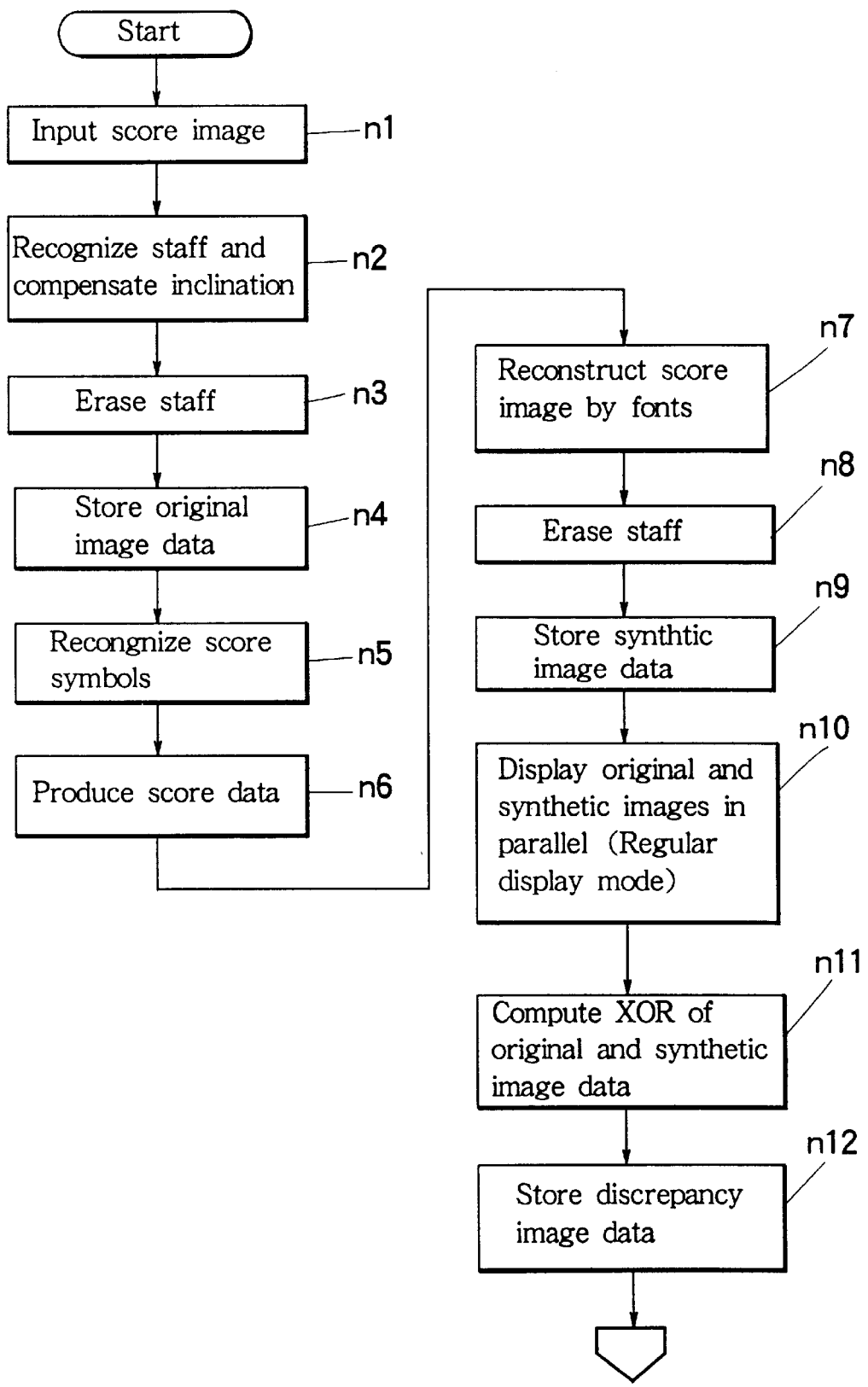
FIG. 16 is a flowchart showing operation of the FIG. 14 score recognition apparatus.
Figure 17:
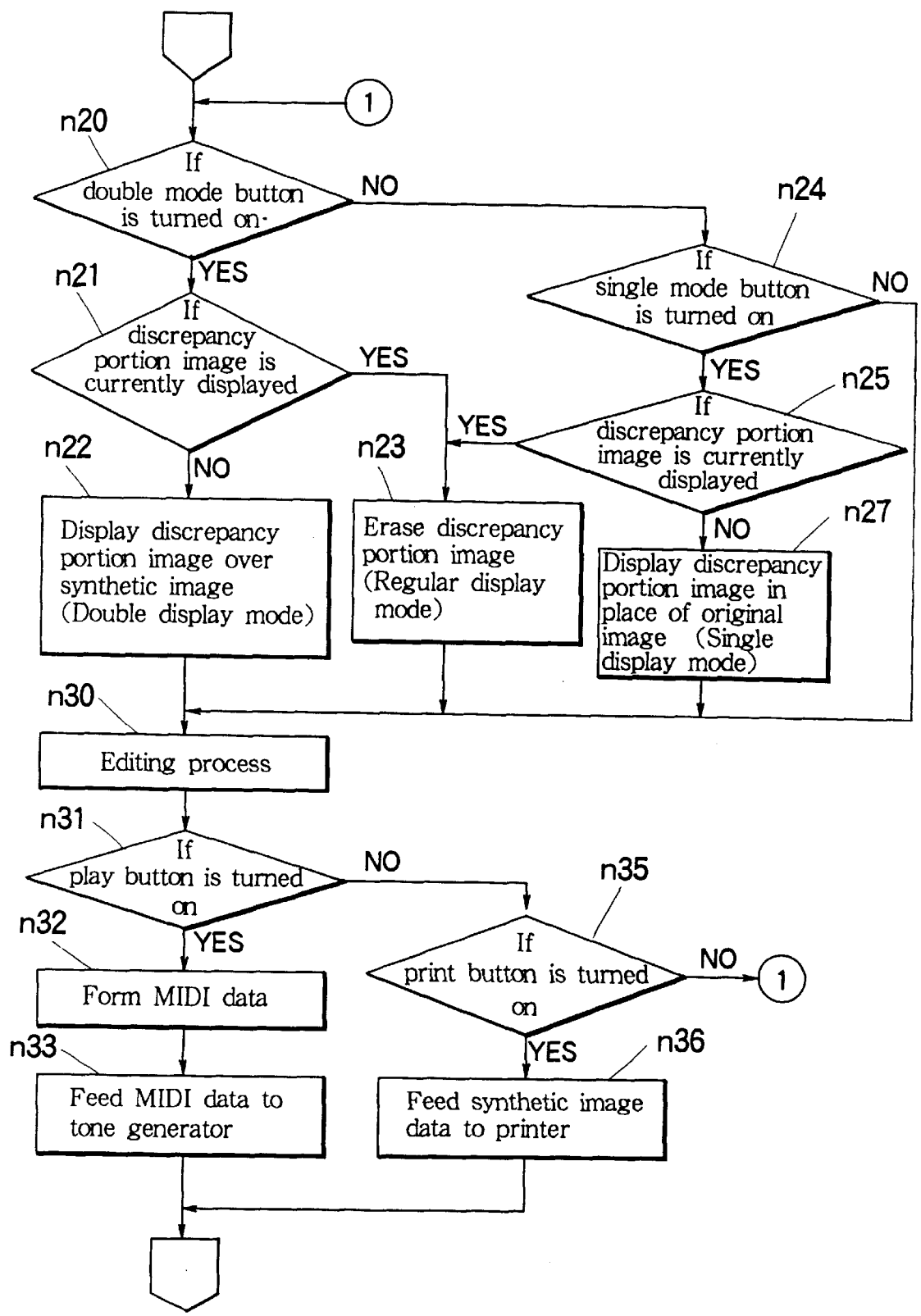
FIG. 17 is a flowchart showing operation of the FIG. 14 score recognition apparatus.
Figure 18:
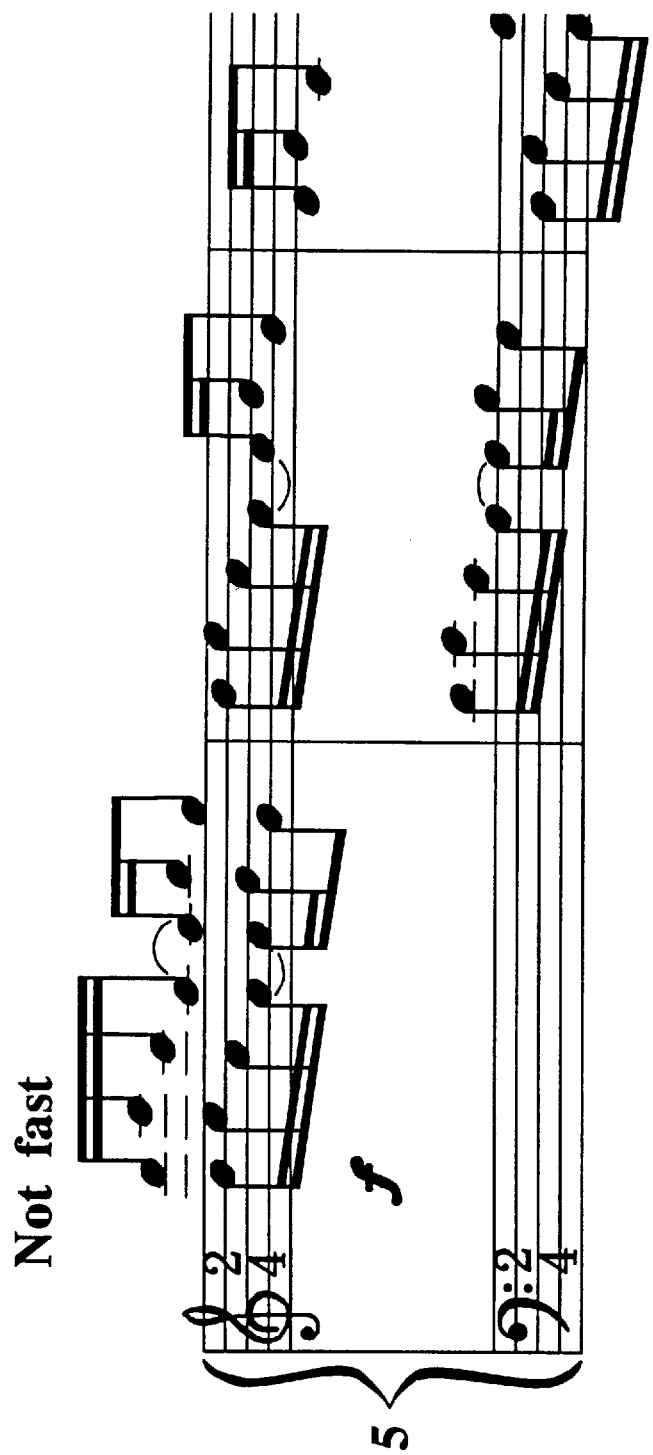
FIG. 18 is an illustrative diagram showing an original image read by the score recognition apparatus.
Figure 19:
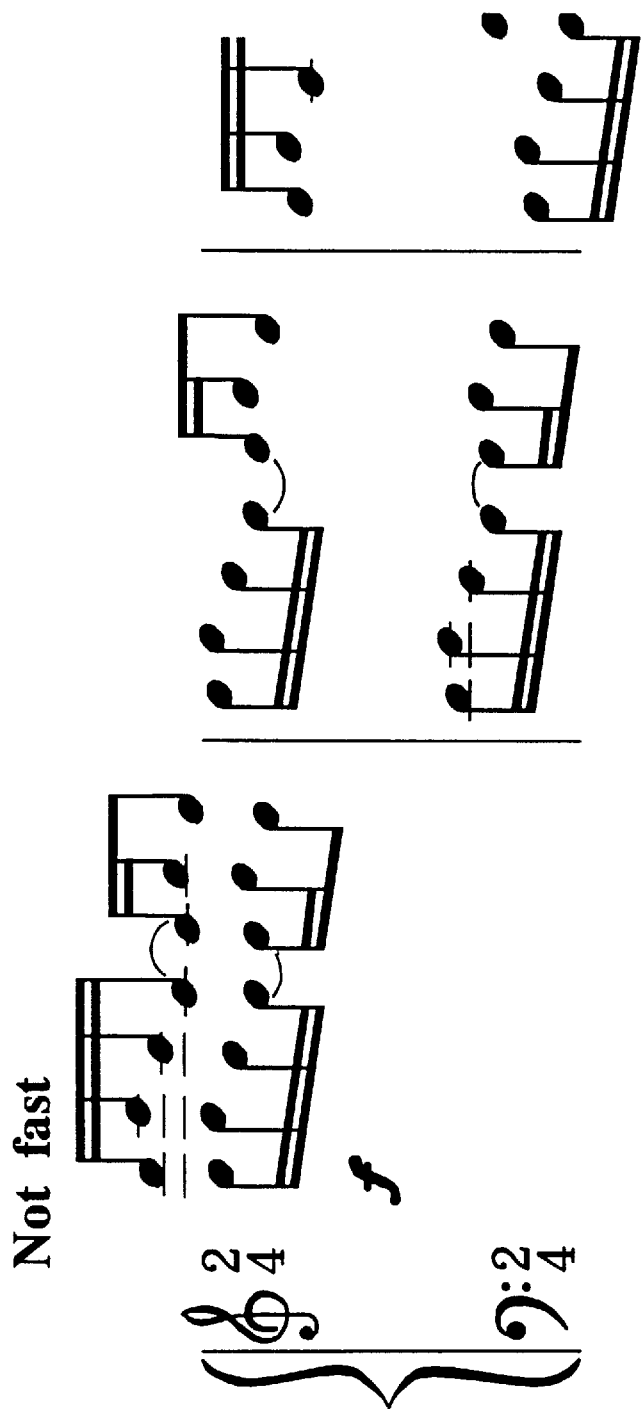
FIG. 19 is an illustrative diagram showing a working image which is obtained by erasing staff lines from the original image of FIG. 18.
Figure 20:
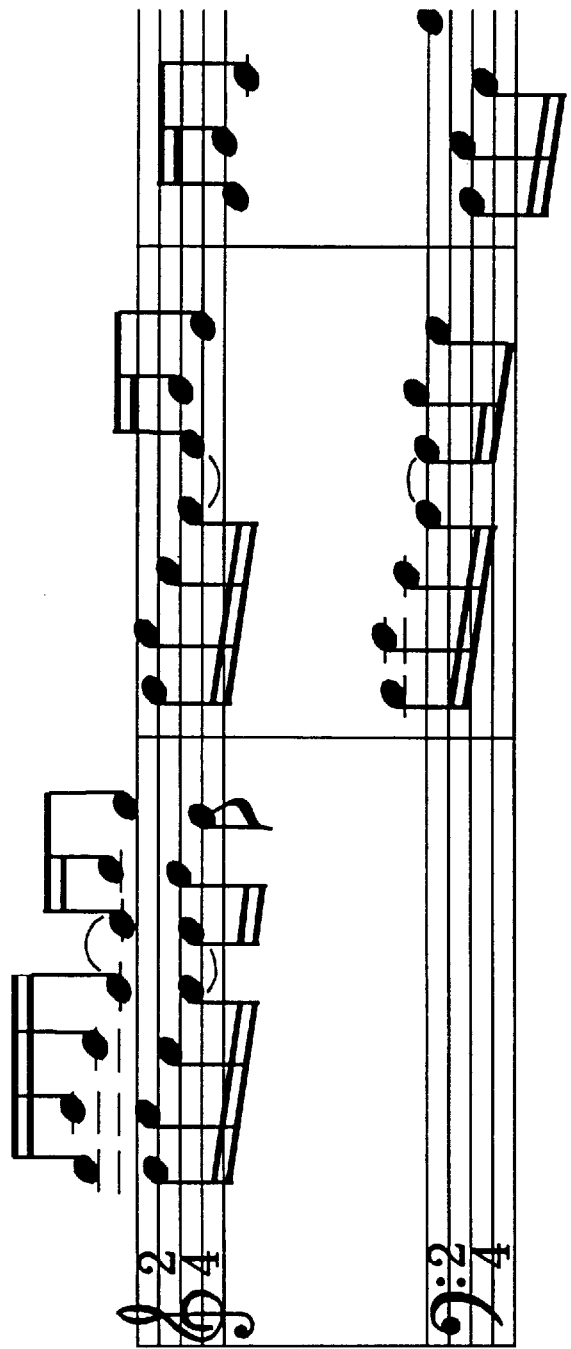
FIG. 20 is an illustrative diagram showing a synthetic image of the score reproduced by recognition of the original image.
Figure 21:
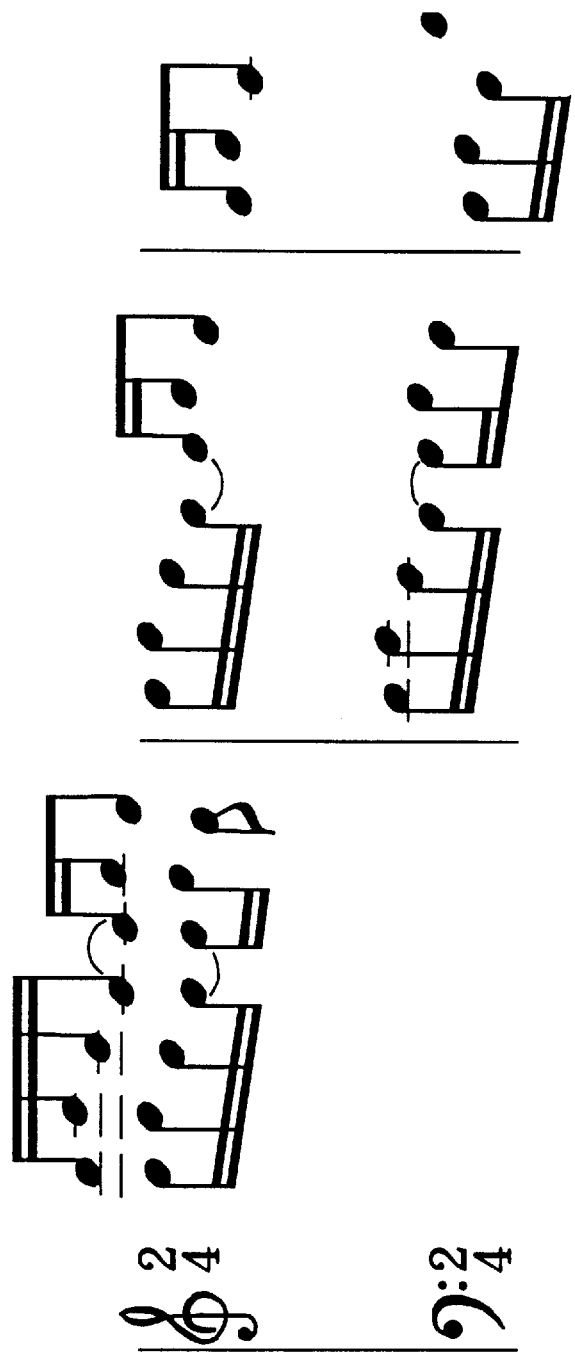
FIG. 21 is an illustrative diagram showing a working image which is obtained by erasing staff lines from the synthetic image of FIG. 20.
Figure 22:
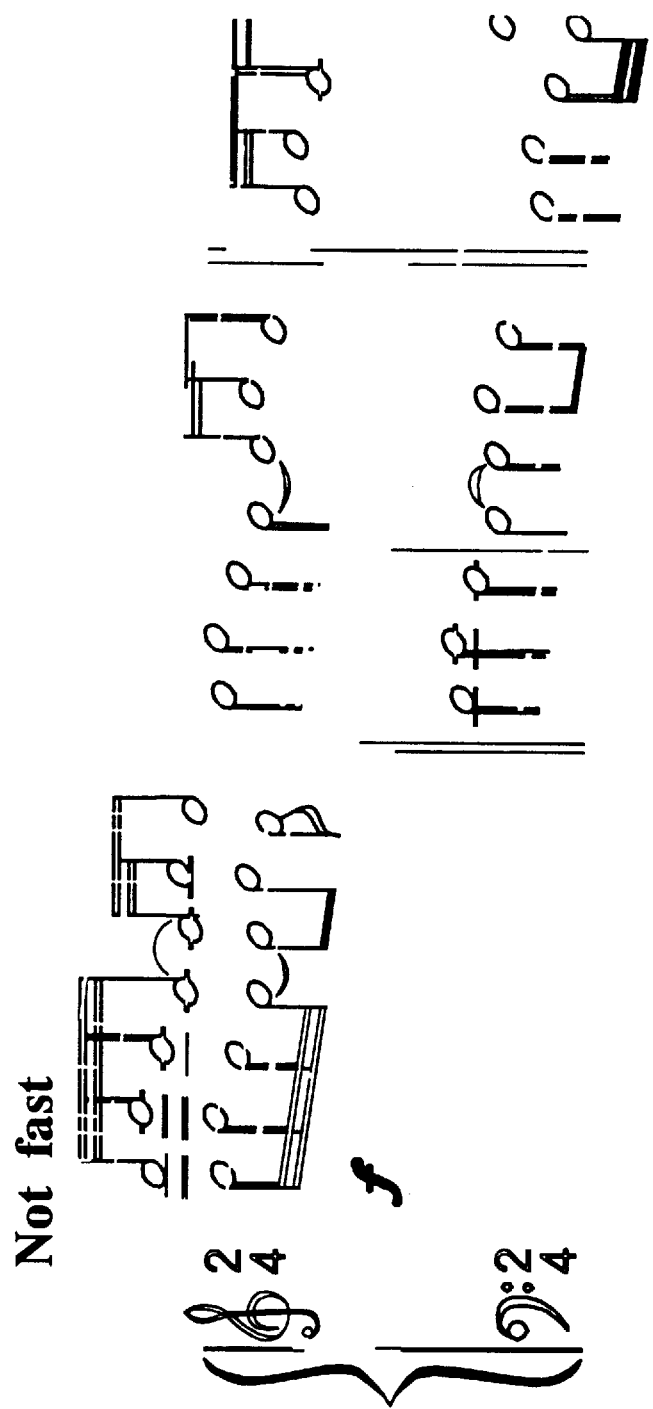
FIG. 22 is an illustrative diagram showing a discrepancy portion between the working images of FIGS. 19 and 21 which are free of the staff lines.

FIGS. 16 and 17 are flowcharts showing the operation of the inventive score recognition apparatus. FIGS. 18–22 show examples of score images processed in various steps of the operation. Referring to FIG. 16, first Step n1 is undertaken to input an image data of a musical score loaded in the image scanner 113. An example of the image of the musical score inputted by this operation is shown in FIG. 18. By such a manner, a bit map data representative of the musical score image is stored in a buffer of the RAM 112. Next in Step n2, staff lines are recognized from the input image so as to compensate for inclination of the image. The recognition of the staff lines is carried out by accumulating binary bits of "0" and "1" or white and black contained in the bit map data, i.e., the input image data. Namely, the staff is composed of five black lines extending transversely of the score, hence the accumulated value has significant peaks corresponding to these lines. Thus, the recognition is made that the five staff lines exist at respective coordinates of the five peaks aligned at a constant pitch. Based on the coordinates detected by such a manner, the five staff lines are extracted from the bit map data. An inclination of the staff lines is detected according to variation in Y coordinates along the extracted staff lines. Further, the image data is entirely rotated by a first order conversion so as to flat the score lines. Thereafter, the five staff lines are erased from the input image data in Step n3 as shown in FIG. 19. In subsequent Step n4, the image data free of the staff lines is memorized in the original image data memory area. Next, in Step n5, notes and other symbols are recognized from the original image data. Then, Step n6 is undertaken to form a score data which is composed of a code data representative of the kinds of the recognized symbols and a position data representative of positions of the recognized symbols. the score data is memorized in the score data memory area of the RAM 112. Next in Step n7, symbol fonts are read out from a font data file based on the score data to arrange the fonts at the respective positions to synthesize an image of the score. This image synthesis is carried out on five staff lines having the same shape as that of the original staff lines recognized in Step n2. The reconstructed image data contains the score symbols arranged on the staff lines as shown in FIG. 20. Then, Step n8 is undertaken to erase the staff lines as shown in FIG. 21. In Step n9, this image data free of the staff lines is memorized in the synthetic image data memory area. After these processes, Step n10 is undertaken to display the pair of the original image and the synthetic image in upper and lower split areas on the screen of the display unit 115 (regular display mode). Further, Step n11 is undertaken to carry out a logical exclusive OR operation (XOR) of the original and synthetic image data to detect a discrepancy portion therebetween to produce a discrepancy image data. Further, in Step n12, the discrepancy image data is memorized in a corresponding memory area of the RAM 112. FIG. 22 shows the discrepancy portion image.

Referring to FIG. 17, subsequently to the above described display operation, the routine enters into button switch process and editing process. If it is judged in Step n20 that the double mode button is turned on, subsequent check is made in Step n21 as to whether the discrepancy portion image is currently presented in the display unit 115. If not, Step n22 is undertaken to display the discrepancy portion image in superposed relation to the synthetic image in the lower window area. In this double display mode, the synthetic image is presented by the black color tone while the discrepancy portion image is presented by the red color tone, thereby discriminating therebetween. On the other hand, if the discrepancy portion image has been already displayed, Step n23 is undertaken to selectively erase the displayed discrepancy portion image from the screen to thereby return to the regular display mode.

If it is judged in Step n24 that the single mode button is turned on, subsequent check is made in Step n25 as to whether the discrepancy portion image is currently viewed. If not, Step n27 is undertaken to present the discrepancy portion image in the upper window area in place of the original image. If the discrepancy portion image has been already displayed, the routine branches to Step n23 where the displayed discrepancy portion image is erased from the screen to thereby restore the regular display mode.

Further, in this operation, the editing process is accepted in Step n30. In the editing process, the mouse implement is utilized to drag symbols of notes, rests and else from the palette to the synthetic image display area, and to selectively erase symbols contained in the synthetic image. By this, the discrepancy portion between the original image data and the synthetic image data is eliminated to form a perfect synthetic image data which exactly coincides with the score read by the image scanner 113. Additionally, the keyboard may be utilized in the editing process to input various numerical values.

If it is judged in Step n31 that the play button is addressed, subsequent Step n32 is undertaken to form a MIDI data based on contents of the score data. In Step n33, the MIDI data is sequentially fed to the tone generator 120 at given timings in response to a given clock to thereby execute playback process. If it is judged in Step n35 that the print button is addressed by the mouse implement, Step n36 is undertaken to feed the synthetic image data together with the staff line image data to the printer 121 to thereby effect printing operation.

By such an operation, the display unit can present the discrepancy portion between the original contents of the score inputted by the image scanner 113 and the recognized contents of the same to enable correction of the discrepancy portion by graphic work on the screen to thereby ensure the perfect reading of the score. The discrepancy portion image is presented in a distinct red color tone under the double display mode in the present mode. However, the distinct color tone is not limited to this. In modification, the display unit 115 may be of a monocolor type. In such a case, the discrepancy portion image may be modified by a hatching pattern or else to discriminate the discrepancy portion from the background of the synthetic image. Further, the discrepancy portion image may be superposed to the original image rather than the synthetic image. In the single display mode, the discrepancy portion image is displayed in place of the original image in the present embodiment. Alternatively, the discrepancy portion image may be displayed in place of the synthetic image. In modification, the display screen may present a set of the original image, the synthetic image and the discrepancy portion image individually from each other. In a preferred form, the discrepancy portion image is displayed such that a first discrepancy portion lacking from the original image is presented in a color tone different from that of a second discrepancy portion lacking from the synthetic image. By this, clear discrimination is held between a deficient portion and an extraneous portion of the synthetic image relative to the original image. For this, subtraction of "original image data" minus "synthetic image data" is computed in a bit by bit basis. In the computation results, a bit of "+1" and another bit of "−1" are displayed in different color tones from each other. In the disclosed embodiment, the original image and the synthetic image are displayed in the simplified form free of the staff lines. However, the original and synthetic images may be displayed in the complete form having the staff lines. In such a case, the staff lines may be deleted from the discrepancy portion image. In a preferred form, a block of discrepancy dots or pixels greater than a predetermined dimension is selectively displayed, rather than displaying the discrepancy portion in a dot by dot basis. By such a treatment, the displayed discrepancy portion image is made free of noises due to tiny irregular shapes of the symbols and stain on the score sheet to thereby indicate a substantially discrepant portion alone. In the disclosed embodiment, the indication of the discrepancy portion is carried out by simply displaying the discrepancy portion image. In modification, the cursor may be automatically moved to point out a specific spot of the discrepancy portion image. Otherwise, the cursor is moved over the display screen to successively point out the discrepancy portions while a buzzer is sounded everywhen the cursor points out the discrepancy portions. Otherwise, a multiple of the cursors may be placed individually at every discrepancy portion.

Referring to FIG. 23, detailed description is given to a third embodiment of the inventive musical score recognition apparatus. A CPU 206 commands an image scanner 202 through a bus line 211 to read sheets of a musical score 201. The image scanner 202 optically scans the musical score 201 to produce a corresponding image data. The image data is transferred to a working memory composed of a RAM 208 through the bus line 211, and is stored therein as an original image data. The image scanner 202 has a resolution power in the order of 300 dpi. The original image data is fed from the RAM 208 to a display unit 203 through the bus line 211 to display an original image of the score. The CPU 206 copies the original image data into a separate memory area within the RAM 208 to prepare a working image data which is identical to the original image data. Recognition process is applied to the working image data, and recognition results are memorized in another RAM 209. Definite score symbols which succeed in the recognition are recorded in a code memory within the RAM 209, while indefinite score symbols which fail in the recognition are separately recorded in a bit map memory within the RAM 209. The code memory memorizes a code data of each definite score symbols. The bit map memory memorizes an image data of each indefinite score symbol.

The CPU 206 reconstructs the musical score based on the recognition results recorded in the RAM 209 to produce a synthetic image data which is stored in the RAM 208. The synthetic image data is reproduced such that a font memory composed of a ROM 210 is addressed according to the code data recorded in the RAM 209 to read out corresponding fonts of the definite symbols. With regard to the indefinite symbols, the image data thereof is read out from the bit map memory of the RAM 209 as it is to fit into the synthetic image data. The synthetic image data is fed from the RAM 208 to the display unit 203 through the bus line 211 to display a synthetic image of the musical score. An input operating group 204 is comprised of input devices such as a mouse implement and a keyboard for carrying out selection of operation menu items indicated on the display unit 203 and for inputting operation commands.

The CPU 206 produces a MIDI data based on the recognition results of the score memorized in the RAM 209, and stores the MIDI data in the RAM 208. The MIDI data is fed from the RAM 208 to an external audio device through a MIDI interface 205 connected to the bus line 211. Reversely, the external audio device may input an MIDI data which is stored in the RAM 208 through the MIDI interface 205. A program memory composed of a ROM 207 stores computation programs. The CPU 206 executes various computation process according to the computation program with using registers and buffers provided in the working memory of the RAM 208.

Figure 24A:
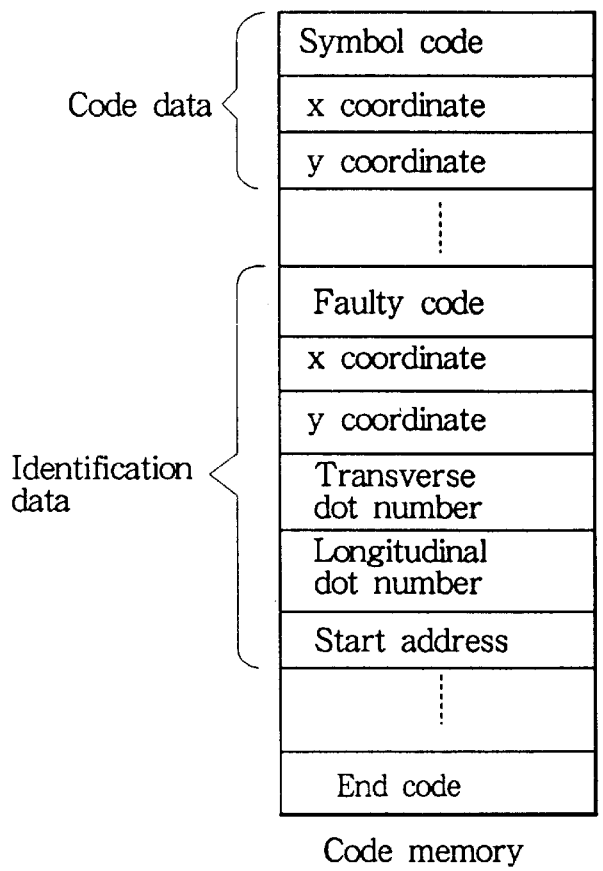
FIG. 24A shows a memory map of a code memory in the third embodiment.
Figure 24B:
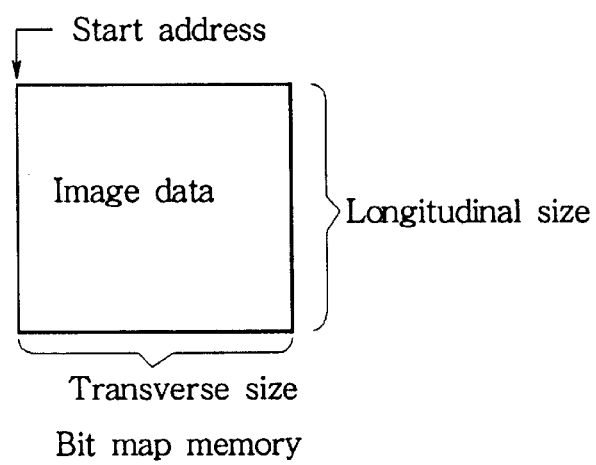
FIG. 24B schematically shows an image data memorized in a bit map memory and specified in terms of a lengthwise pixel number, a widthwise pixel number, and a start address.

Referring to FIGS. 24A and 24B, the RAM 209 contains the code memory and the bit map memory. The code memory records the code data of the recognized definite symbols, while the bit map memory records the image data of the unrecognized indefinite symbols. As shown in FIG. 24A, the code memory of the RAM 209 stores an identification data of the unrecognized symbols in addition to the code data of the recognized symbols, thereby recording the recognition results of the score, i.e., score data. An end code is added at an end of the score data. The code data denotes a code of an individual score symbol. After the score symbols are recognized from the original image data inputted by the image scanner, each of the recognized symbols is converted into a corresponding symbol code, which is recorded in the code memory as the code data. The code is assigned to each species of the score symbols to discriminate from each other. For example, various symbols such as a G clef, an F clef, a time signature, notes and rests are identified by respective symbol codes. The code memory further records a position data of each recognized symbol in terms of x and y coordinates indicating the position of the symbol on the score. On the other hand, the identification data is composed of a faulty code, an x coordinate, a y coordinate, a transverse dot number, a longitudinal dot number and a start address. The faulty code is memorized when a certain symbol is not successfully recognized from the original image data. Consequently, the recognized symbol is accorded with the corresponding code, while the unrecognized symbol is accorded with the faulty code.

FIG. 24B shows a format of the bit map memory. After the recognition process of the original image data, each of the unrecognized symbol is circumscribed by a rectangle to cut out therefrom an image data block. The image data block within the circumscribing rectangle is copied into the bit map memory. Further, the identification data area of the code memory is written with the x coordinate, y coordinate, transverse dot number, longitudinal dot number of the circumscribing rectangle, as well as the start address of the bit map memory where the image data block of the unrecognized symbol is recorded. The x and y coordinates denote a position of an upper left corner of the circumscribing rectangle on the score image. The transverse dot number indicates a number of dots transversely arranged in the rectangle, and the longitudinal dot number indicates a number of dots longitudinally arranged in the rectangle. The start address specifies a first dot of the rectangle on the bit map memory such that the image data block contained in the rectangle can be read out sequentially from the start address of the bit map memory. Alternatively, the image data of the unrecognized symbol may not be copied into the separate bit map memory, but the image data block contained in the circumscribed rectangle can be directly read out from the original image data area of the RAM 208 for the display purpose or else.

Referring to FIG. 25A, the display unit visually presents the original image of the score as exemplified. The original image of the score read by the image scanner is stored in the RAM as the original image data. The original image data is fed to the display unit to visually present the score image. The recognition is applied to the original image of the score. Firstly, the recognition is executed for staff lines 226. Then, the recognized staff lines are erased from the original image so that five image blocks 221, 222, 223, 224 and 225 composed of black dots are left in the score image. The recognition is applied to the first image block 221, however the first image block 221 cannot be successfully identified because the image block 221 is deformed from a typical form of a G clef in the exemplified case. Further, the recognition process is applied to the other image blocks 222, 223, 224 and 225. Consequently, the image block 222 is successfully identified as a time signature C, and the image blocks 223, 224 and 225 are successfully identified as a quarter note. Namely, the image block 221 fails in the recognition, while the image blocks 222, 223, 224 and 225 succeed in the recognition.

Referring to FIG. 25C, the description is given to a format of the code memory for recording the recognition results in the above exemplified case. the successful image blocks 222, 223, 224 and 225 are converted into corresponding symbol codes. The image block 222 is converted into a symbol code representative of the time signature C. Then, the position data thereof is determined in terms of x and y coordinates at an upper left corner of a rectangle which circumscribes the image block 222 on the bit map of the original image data. The converted symbol code and the determined x and y coordinates are recorded in the code memory. The image blocks 223, 224 and 225 are converted into a symbol code representative of the quarter note. Further, the x and y coordinates are determined at an upper left corner of each rectangle which circumscribes the respective one of the blocks 223, 224 and 225. The thus obtained symbol code and the x and y coordinates are recorded in the code memory.

On the other hand, a faulty code is assigned to the unrecognized image block 221, and a rectangle 220 is set to circumscribe the image block 221. The code memory records the faulty code together with the transverse dot number and the longitudinal dot number of the circumscribing rectangle. Further, the position data of the rectangle is also memorized in terms of the coordinate value (x1, y1) at the upper and left corner of the rectangle. In the two-dimensional coordinate system which is set on the original image, the x axis is set in the horizontal direction and the y axis is set in the vertical direction on the score image. Further, the start address is recorded to specify the first dot of the bit map of the image data contained in the circumscribing rectangle. In the present embodiment, the code memory memorizes the x and y coordinates of the upper and left corner of the rectangle which encloses the image block. Alternatively, the code memory may memorizes x and y coordinates at a center of the circumscribing rectangle. Otherwise, a position of the x and y coordinates may be varied dependently on items of the score symbols. For example, a center point of a note head may be memorized for a note symbol, while a center point of a whole symbol shape may be memorized for a time signature.

Referring to FIG. 25B, there is exemplified a format of the bit map memory where the unrecognized image block 221 is recorded. The image data block enclosed by the circumscribing rectangle is memorized in the bit map memory as a segment of a bit map. However, as mentioned before, the segment of the bit map may be directly retrieved from the RAM 208 for displaying or else rather than copying the segment of the bit map into the RAM 209.

Figure 26:
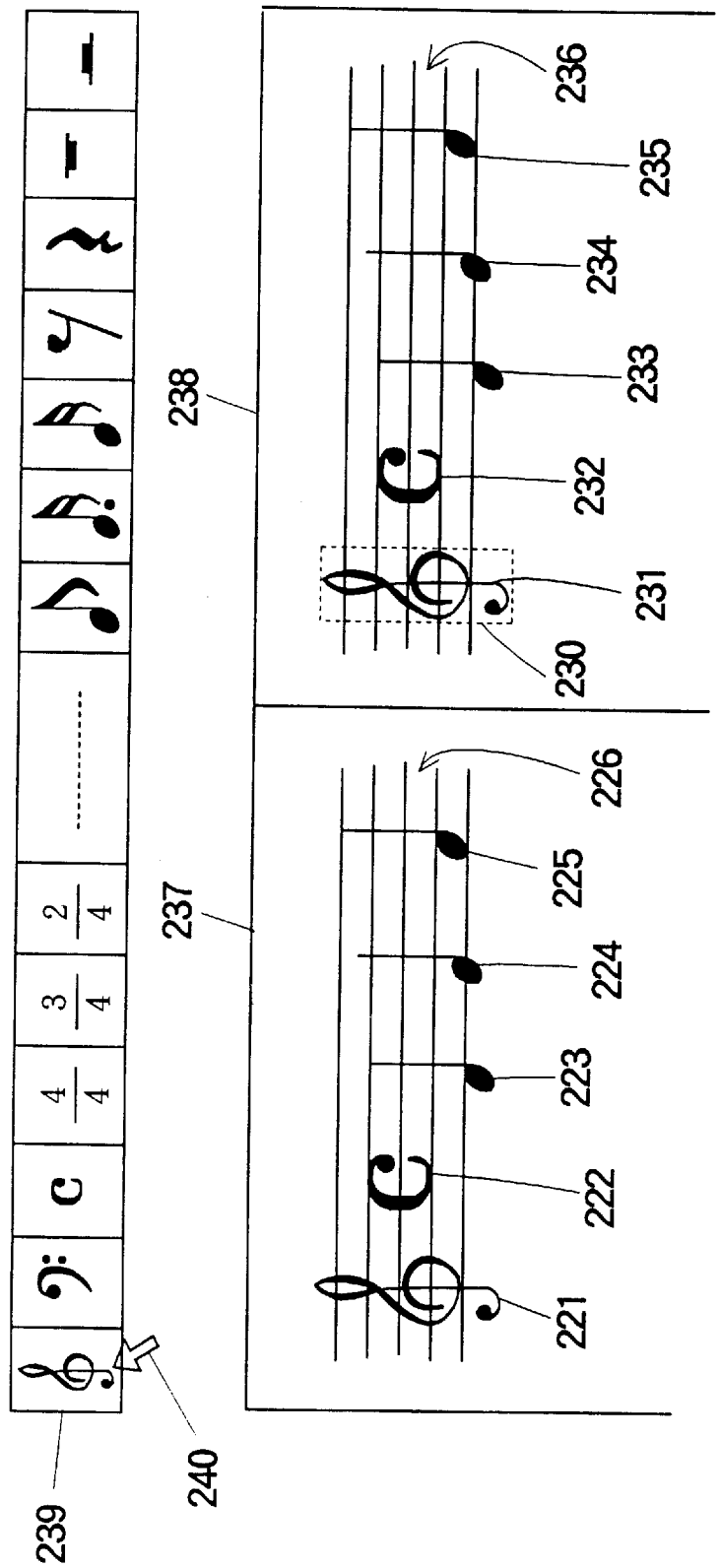
FIG. 26 is an illustrative diagram showing a display example of a synthetic image reproduced from the score elements stored in the code memory and the bit map memory.

Referring to FIG. 26, the display unit visually presents the synthetic image of the musical score, which is reproduced according to the score data recorded in the code memory and the bit map memory.

The display screen has an original image display area 237, a synthetic image display area 238, a symbol palette area 239 and a movable mouse cursor 240. The score inputted by the image scanner is converted into the two-dimensional original image data, and the original image is presented in the left display area 237. The original image data is subjected to the recognition process. As mentioned before, the original image contains the staff image block 226 and five separate image blocks 221, 222, 223, 224 and 225. In the recognition process, the image block 221 fails in the recognition so that the image block 221 is recorded as it is in the bit map memory. On the other hand, the image blocks 222, 223, 224 and 225 succeed in the recognition so that the image blocks 222, 223, 224 and 225 are recorded in the code memory. Namely, the image block 222 is converted into a symbol code of the time signature C, and all of the three image blocks 223, 224 and 225 are converted into another symbol code of the quarter note. These symbol codes are memorized in the code memory together with the position data indicating a position of the respective score symbols.

The staff image block 226 is also subjected to the recognition process to detect an interval and a width of the staff lines. A new staff image block 236 is reproduced in the synthetic image, having the same interval and width as the recognized staff 226. Then, the code memory is addressed to read the symbol codes stored therein. If the read code denotes a time signature, a corresponding font is read out from the font ROM. The read font is located at a position determined by the x and y coordinates which are concurrently read out from the code memory to thereby form the image block 232 in the synthetic image. In similar manner, respective symbol codes and corresponding x and y coordinates are read out from the code memory to form the image blocks 233, 234 and 235 with using a font of a quarter note stored in the font ROM. The font ROM stores various symbol fonts in the form of a bit map or else.

On the other hand, when a faulty code is detected, the accompanied data of x coordinate, y coordinate, transverse dot number, longitudinal dot number and start address are also read out from the code memory. Then, a corresponding image data block circumscribed by the rectangle is retrieved from the bit map memory according to the start address. The circumscribing rectangle is determined in terms of the read transverse dot number and the longitudinal dot number. Further, the position of the read image data block on the score image is calculated according to the read x and y coordinates so as to form the image block 231 in the calculated position of the synthetic image. The image block 231 is circumscribed by the rectangle 230, such that the circumscribed original image data reserved in the bit map memory is reproduced as it is in the form of the image block 231 on the synthetic image.

By such an operation, the synthetic image is reproduced, which contains the image blocks 231, 232, 233, 234, 235 and 236. The synthetic image is presented in the right side area 238 of the display unit. In the presentation, the black color tone is applied to the image blocks 232, 233, 234 and 235 which are formed based on the code data stored in the code memory, and the same is applied to the image block 236 representative of the staff lines, while the red color tone is applied to the image block 231 which is formed based on the image data block stored in the bit map memory. Namely, the recognized symbols are indicated by the black color tone, while the unrecognized symbol is indicated by the red color tone. Therefore, the recognized and unrecognized symbols are readily discriminated from each other according to differences in the display color tones. Alternatively, the unrecognized symbol may be displayed in a flashing form rather than in the red color tone, to readily enable a judgement of the recognition results.

Next, description is given to the editing operation for replacing the unrecognized score symbol by a correct score symbol. As described above, the unrecognized symbol is displayed in the red color tone within the synthetic image display area 238. First, the image block 231 of the red color tone is designated, and then a correct symbol is selected from the score symbol palette 239. In detail, the user compares the image block, 231 of the synthetic image with the corresponding image block 221 of the original image to judge that the image block 231 should be a G clef. Then, the mouse implement is operated to move the cursor 240 to point a pattern of a G clef listed in the palette area 239. Thereafter, the mouse button is clicked so that the image block 231 is replaced by a font block of G clef. The thus selected code of the G clef and the accompanied x and y coordinates are recorded in the code memory, while the image data of the block 231 is erased from the bit map memory. Consequently, the image block 231 of the red color tone disappears from the synthetic image display area 238. Instead, the G clef font is retrieved from the ROM according to the G clef code stored in the code memory to form a new image block of the synthetic image which is displayed in the right side area 238. By such a manner, each image block having the red color tone is designated by the mouse implement within the synthetic image display area 238, and a correct score symbol is selected from the palette area 239, thereby enabling the user to complete the recognition of the score.

Figure 27:
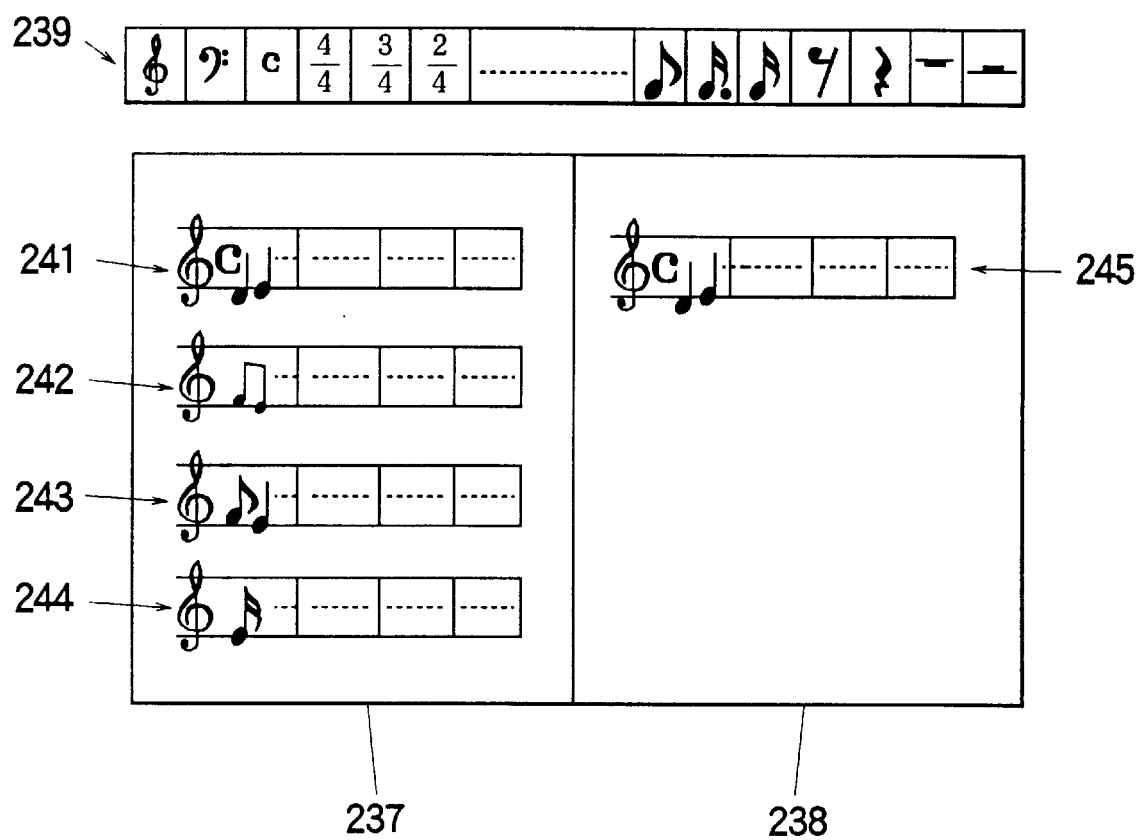
FIG. 27 is an illustrative diagram showing recognition and display procedures of the original image read by the image scanner.

Referring to FIG. 27, the original image inputted by the image scanner is recognized and displayed a part by part basis. A whole of the original image is displayed in the left side area 237. The recognition process is carried out based on the original image displayed in the left side area 237 of the screen. First, staff lines are recognized from the original image. Consequently, it is determined that the original image of the score is composed of four rows of staff sections 241, 242, 243 and 244. Each staff section contains five staff lines and score symbols on the staff lines to define one performance unit. Then, the recognition of the original image and the reproduction of the synthetic image are sequentially carried out for each row of the staff sections. The first row of the staff section 241 of the original image is subjected to the recognition analysis to form the synthetic image to thereby display a reconstructed first row of a staff section 245 in a synthetic image display area 238. The whole of the original image and a part of the synthetic image at this stage are illustrated by FIG. 27. In addition, the display screen presents a symbol palette area 239 from which a correct symbol is selected by the user to replace an unrecognized symbol. Then, the second row of the staff section 242 of the original image is subjected to the symbol recognition to form the synthetic image data to thereby present a second row of the staff sections of the synthetic image on the right side area 238. Subsequently, the third row of the staff section 243 of the original image is subjected to the recognition process to display a corresponding third row of the staff section of the synthetic image. Lastly, the fourth row of the staff section 244 of the original image is processed to display a corresponding fourth row of the staff section of the synthetic image.

In contrast, all of the four rows of the staff sections 241, 242, 243 and 244 contained in the original image may be subjected to the recognition process at once to form corresponding four rows of staff sections of the synthetic image. However, in such a process, the synthetic image is not displayed as long as the recognition process is continued for all of the four staff sections. The score recognition process requires a long time for achieving a high recognition rate for complicated score. Consequently, the user must wait for a long time without a response from input of the score by the image scanner until completion of the score recognition. In view of this, according to the present invention, the recognition is sequentially effected for each row of the original staffs to successively display a corresponding row of the synthetic staffs representative of the recognition results, hence the user can monitor progression of the recognition process. In modification, when treating a complex score representative of an orchestra or a chorus having a plurality of parts, the score is divided into parts and each part is further divided into staff sections to define each performance unit, which is individually subjected to the recognition process.

Figure 28:
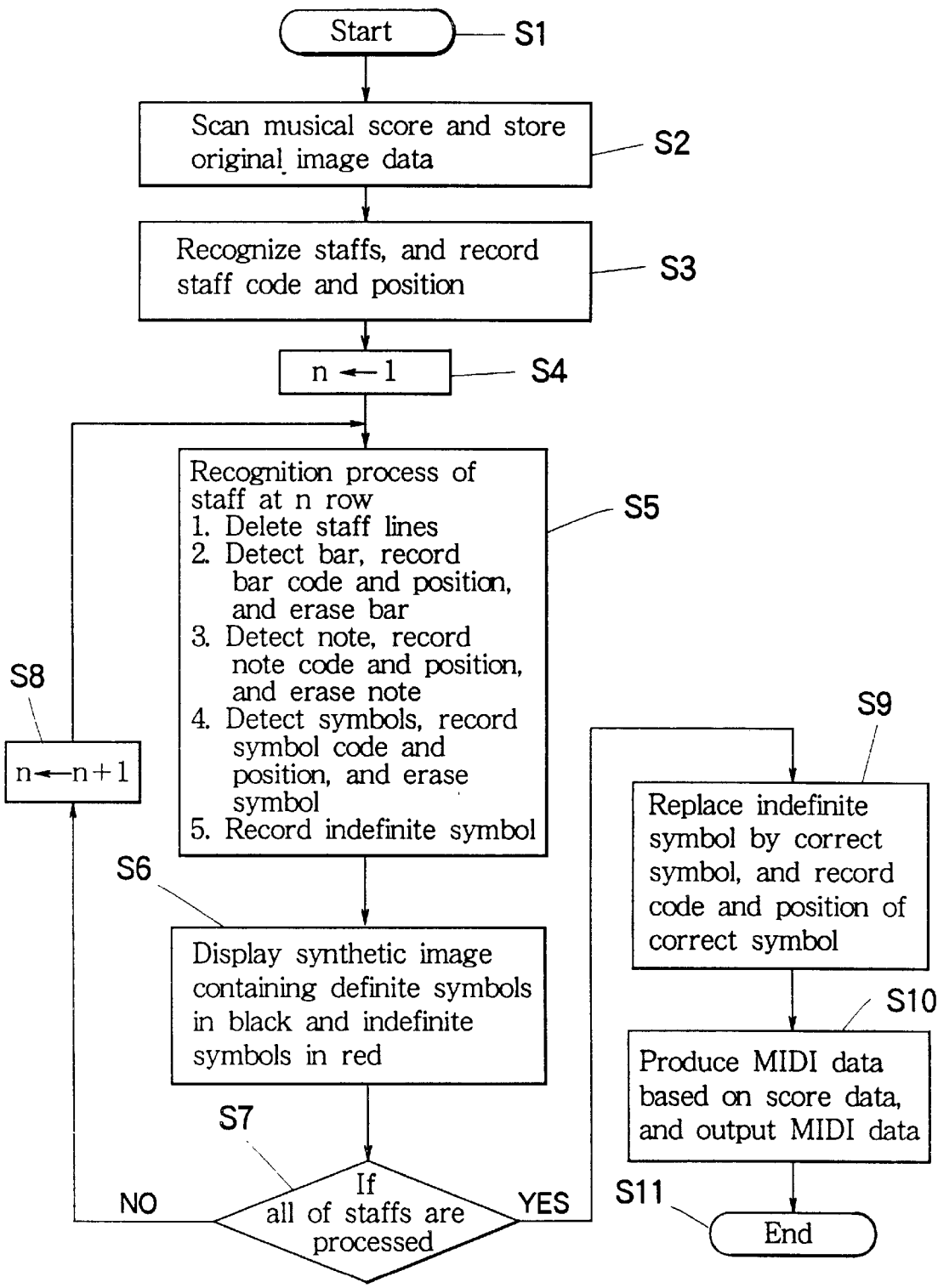
FIG. 28 is a flowchart showing a display process of the score recognition results and a correction process thereof, which are executed by a CPU of the third embodiment.

Referring to FIG. 28, the description is given to a process flow of displaying and editing the score recognition results by the CPU of the score recognition apparatus. The process starts from Step S1 to proceed to Step S2 where the image scanner is operated to read a musical score. In response to a command, the image scanner scans the score to convert the same into a binary image data. The binary image data of the score inputted by the image scanner is stored in the RAM as an original image data. The original image data is copied into another area of a working memory composed of the RAM to thereby provide a working image data. Thereafter, the working image data is subjected to the recognition process on the working memory. In subsequent Step S3, staff lines are recognized from the working image data stored in the working memory to determine rows of staff sections contained in the inputted score. Then, the working image data is divided into the respective staff sections. Further a symbol code of each recognized staff and a position data thereof are recorded in the code memory. In Step S4, a count register n is set with an initial count "1". The register n functions as a variable indicating an order of the row of the staff section which is subjected to the recognition process. By setting the initial count "1" to the register n, the recognition process is sequentially started from the first row of the staff sections.

In Step S5, the recognition process is executed for an n row of the staff section designated by the count register n according to the following procedure. The recognition process of the staff section including the recognition of the staff lines in Step S3 is carried out according to a typical method, for example, disclosed in Japanese Patent Application Laid-Open No. 5-35924 (1993). First, an image block of the staff lines already recognized in Step S3 is erased from the working image data. Next, each image block of vertical lines is detected on the working image data to recognize therefrom bars. A position of the detected bar is converted into a coordinate position data. The coordinate position data and the code data of the bar are recorded in the code memory. Thereafter, the image block of the recognized bar is erased from the working image data. By such a manner, all of the bars are recognized and erased from the n row of the staff section. Next, image blocks indicative of notes are searched to detect and recognize notes. Further, a position of the detected note is converted into a coordinate position data. The coordinate position data and the code data of the detected note are recorded in the code memory. The symbol code may indicate various species of notes such as a quarter note and a dotted eighth note involved in the staff section. Thereafter, the image block of the detected note is erased from the working image data. By such a manner, all of the notes involved in the n row of the staff section are recognized and erased therefrom. Next, other image blocks indicative of various symbols such as a G clef, a time signature, a rest and a sharp are detected to obtain corresponding symbol codes. A position of each detected symbol is converted into a coordinate position data. The coordinate position data and the code data of the detected symbol are recorded in the code memory. Thereafter, the image block of the detected symbol is erased from the working image data. In similar manner, all of the detected image blocks are erased from the n row of the staff. Consequently, the n row of the staff section lastly contains only an unrecognized image block. The remaining image block is enclosed by a circumscribing rectangle. A position, a longituinal size and a transverse size of the circumscribing rectangle are recorded in the code memory together with a faulty code. Further, an image data block contained in the circumscribing rectangle is copied into the bit map memory. Thereafter, the image data block within the rectangle is erased from the working image data. A similar process is applied to all of the remaining image blocks to completely erase the same from the n row of the staff section.

In Step S6, the display unit visually presents a synthetic image containing symbols recorded in the code memory and the bit map memory. First, the code memory is addressed to retrieve therefrom each code data containing a symbol code and a position coordinate. A symbol font corresponding to the symbol code is retrieved from the font ROM to form a synthetic image thereof according to the position coordinate. The synthetic image of the symbol is displayed in the black color tone. Further, the code memory is searched to retrieve therefrom each faulty data accompanied by a position coordinate, a transverse dot number, a longitudinal dot number and a start address. Then, an image data block circumscribed by a rectangle determined by the transverse and longitudinal dot numbers is read out from the start address of the bit map memory to thereby form an image block at the coordinate position in the synthetic image. The image block is displayed in the red color tone. In Step S7, check is made as to if all of the rows of the staff sections are completely processed. As described before, the row number of the score staff sections has been already identified in Step S3. The count register n indicates a number of rows of the staff sections which have been processed. If the count register n does not yet indicate the last row of the staff sections, the process proceeds to Step S8 where the count register n is incremented, thereby returning to Step S5 to execute the processing of a next row of the staff section in similar manner.

If the count register n indicates the last row of the staff section in Step S7, the recognition process is finished to thereby advance to Step S9. In this step, an indefinite symbol which fails in the recognition process of Step S5 is corrected by the graphic editing operation by the user. First, the user operates the mouse implement to select one of the red color tone image blocks from the displayed synthetic image. Next, the user selects a correct symbol from the palette area so as to replace the selected image block. A code of the selected correct symbol is memorized in the code memory together with a coordinate position data of the selected image block. Then, the image data of the selected image block is erased from the bit map memory so that the red color tone image block disappears from the display screen. Instead, a new image block of the block color tone is displayed by using the symbol font stored in the font ROM. In Step S10, a MIDI data is produced according to the score data stored in the code memory. The produced MIDI data is outputted from the MIDI interface. Thereafter, Step S11 is undertaken to finish the routine.

As described above, the recognition results are visually presented as the synthetic image such that the recognized and unrecognized symbols are displayed in different color tones from each other to thereby notify the user of the processed results of the score recognition apparatus. By this, the user is not required to closely check the recognition results, but the user only checks a part of the red color tone to selectively correct the unrecognized symbols to thereby facilitate the editing of the score data. For this, the user operates the mouse implement or other tools to select a correct symbol from the palette area to thereby realize an efficient graphic editing operation. The score is typically composed of rows of staffs vertically arranged in the score. In view of this, staff line elements are initially recognized to divide the score into rows of the staffs which represent performance units. The recognition process of the score is sequentially carried out for each row of the staffs. By this, the user can monitor progression of the score recognition. In such a case, the user may interrupt the recognition process to execute the correction. The present invention is not limited to the disclosed embodiment, but may cover various modifications.

As described above, according to the first aspect of the invention, the original image and the synthetic image of the same musical score are concurrently changed with each other in response to the screen operation such as scaling, scrolling and sizing. Consequently, the original and synthetic images are viewed in parallel to each other on the screen to facilitate visual comparison therebetween. A difference between the original and synthetic images can be readily found to thereby facilitate the visual inspection of recognition errors. According to the second aspect of the present invention, the original image data of the read score is compared with the synthetic image representative of the recognition results of the score to detect a discrepancy portion, which is then visually indicated in the display screen. By this, recognition errors can be viewed for ready check thereof. In this case, the original image and the synthetic image are arranged on the identical staff such that the correctly recognized score symbol is arranged in the same position and the same shape as those of the original score symbol to thereby facilitate discrimination of the discrepancy portion. Further, the discrepancy portion is superposed to either of the original and synthetic images such that the user can visually monitor the discrepancy portion to correct the same, thereby perfecting the score recognition. Further, a discrepancy portion originating from the original image and another discrepancy portion originating from the synthetic image are displayed in different appearances so that the user can determine as to whether the discrepancy is caused by deficient recognition or extraneous recognition to thereby facilitate the correction. Moreover, a discrepancy portion greater than a predetermined size is selected to visualize a substantive discrepancy while precluding a negligible discrepancy due to noises such as a stain of the score sheet and an irregular deformation of the symbol pattern. By this, the substantial discrepancy is clearly visualized to facilitate the correction. In addition, the staff lines are provisionally erased from the original and synthetic images, which are then compared with each other to detect the discrepancy therebetween, thereby simplifying the image process and improving the process speed. According to the third aspect of the invention, the definite symbol which succeeds in the recognition and the indefinite symbol which fails in the recognition are displayed in different graphic modes so that the user can readily pick up the unrecognized symbol and can replace the same by a correct symbol.

What is claimed is:

1. A score recognition apparatus comprising:

a score reader to form an original image data of a score;

a processor for analyzing the original image data to recognize therefrom score elements to provide a corresponding score data;

a processor for synthesizing synthetic image data of the score based upon the score data, the synthetic image data having portions corresponding to portions of the original image data in both horizontal and vertical positions;

a display screen for displaying an original image and a synthetic image in response to display data;

a user interface for receiving an operation command to control a screen operation of a displayed image; and a processor responsive to the operation command for processing the original image data and the synthetic image data to provide display data to the display screen such that the display screen displays corresponding portions of the synthetic image data and the original image data together for visual comparison of the corresponding portions, the portion of the synthetic image data corresponding in both horizontal and vertical positions to the portion of the original image data, wherein the user interface is capable of receiving an operation command to initiate a scrolling screen operation in the horizontal direction to concurrently horizontally scroll the displayed original image and the synthetic image within a pair of parallel display areas defined on the display screen, and the user interface is capable of receiving an operation command to initiate a scrolling screen operation in the vertical direction to concurrently vertically scroll the displayed original image and the synthetic image within a pair of parallel display areas defined on the display screen.

2. A score recognition apparatus according to claim 1, wherein the user interface is capable of receiving an operation command to initiate a scrolling screen operation to scroll the displayed original image and synthetic image at the same scrolling pitch.

3. A score recognition apparatus comprising:

a score reader to form an original image data of a score;

a processor for analyzing the original image data to recognize therefrom score elements to provide a corresponding score data;

a processor for synthesizing synthetic image data of the score based upon the score data, the synthetic image data having portions corresponding to portions of the original image data;

a display screen for displaying an original image and a synthetic image in response to display data;

a user interface for receiving an operation command to control a screen operation of a displayed image; and a processor responsive to the operation command for processing the original image data and the synthetic image data to provide display data to the display screen such that the display screen displays corresponding portions of the synthetic image data and the original image data together for visual comparison of the corresponding portions, wherein the user interface is capable of receiving an operation command to initiate a scrolling screen operation to concurrently scroll the displayed original image and the synthetic image within a pair of parallel display areas defined on the display screen, and the user interface is capable of receiving an operation command to initiate a scaling screen operation such that the original image and the synthetic image are reduced or enlarged by the same scale and such that the scaled original and synthetic images are displayed within a pair of parallel display areas defined on the display screen.

4. A score recognition apparatus comprising:

a score reader to form an original image data of a score;

a processor for analyzing the original image data to recognize therefrom score elements to provide a corresponding score data;

a processor for synthesizing synthetic image data of the score based upon the score data, the synthetic image data having portions corresponding to portions of the original image data;

a display screen for displaying an original image and a synthetic image in response to display data;

a user interface for receiving an operation command to control a screen operation of a displayed image; and a processor responsive to the operation command for processing the original image data and the synthetic image data to provide display data to the display screen such that the display screen displays corresponding portions of the synthetic image data and the original image data together for visual comparison of the corresponding portions, wherein the user interface is capable of receiving an operation command to initiate a scrolling screen operation to concurrently scroll the displayed original image and the synthetic image within a pair of parallel display areas defined on the display screen, and the user interface is capable of receiving an operation command to initiate a sizing screen operation such that the displayed original image and synthetic image are sized to cut out a pair of corresponding portions thereof and such that the corresponding portions are displayed in a pair of correspondingly sized display areas defined on the display screen.

5. A score recognition apparatus comprising:

a score reader to form an original image data of a score;

a processor for analyzing the original image data to recognize therefrom score elements to provide a corresponding score data;

a processor for synthesizing synthetic image data of the score based upon the score data, the synthetic image data having portions corresponding to portions of the original image data;

a display screen for displaying an original image and a synthetic image in response to display data;

a user interface for receiving an operation command to control a screen operation of a displayed image; and a processor responsive to the operation command for processing the original image data and the synthetic image data to provide display data to the display screen such that the display screen displays corresponding portions of the synthetic image data and the original image data together for visual comparison of the corresponding portions, wherein the user interface is capable of receiving an operation command to initiate a scrolling screen operation to concurrently scroll the displayed original image and the synthetic image within a pair of parallel display areas defined on the display screen, and the processor responsive to the operation command optimizes a relative arrangement of the displayed original image and synthetic image on the screen according to the screen operation.

6. A score recognition apparatus comprising:

a score reader to form an original image data of a score;

a processor for analyzing the original image data to recognize therefrom score elements to provide a corresponding score data;

a processor for synthesizing a synthetic image data of the score based upon the score data;

a display for displaying an original image and a synthetic image of the same score in a pair of split display areas arranged substantially in parallel based upon the original image data and the synthetic image data;

a user interface for receiving an operation command effective to designate at least a magnification factor for the split display areas; and a controller for controlling the display responsive to the operation command to optimize an arrangement orientation of the pair of the split display areas in response to the designated magnification factor.

7. A score recognition apparatus according to claim 6, wherein the controller is responsive to an operation command for arranging the pair of the split display areas on left and right portions of the display, and being responsive to an operation command for arranging the pair of split display areas on top and bottom portions of the display.

8. A score recognition apparatus according to claim 6, wherein the controller is responsive to an operation command effective to change the arrangement orientation of the pair of the split display areas according to the designated size and shape.

9. A score recognition apparatus according to claim 8, wherein the controller is responsive to an operation command for changing an arrangement of the pair of the split display areas displayed on left and right portions of the display into an arrangement of the pair of split display areas displayed on top and bottom portions of the display.

10. A score recognition apparatus according to claim 6, wherein the controller is responsive to an operation command effective to designate a size and shape of each of the split display areas to fit the displayed original image and synthetic image into respective split display areas having the designated size and shape, and to change the arrangement orientation of the pair of the split display areas according to the designated size and shape.

11. A score recognition apparatus according to claim 6, wherein the split display areas are divided by a split line defining a first orientation, and the user interface is capable of receiving an operation command for arranging the split line in a second orientation different from the first orientation.

12. A score recognition apparatus according to claim 11, wherein the first orientation is generally vertical and the second orientation is generally horizontal.

13. A score recognition apparatus according to claim 6, wherein the controller is responsive to a first operation command for setting an arrangement of the pair of the split display areas to be displayed on left and right portions of the display, and responsive to a second operation command effective to designate a magnification factor for the pair of the split display areas for automatically setting an arrangement of the pair of split display areas to be displayed on top and bottom portions of the display.

14. A score recognition apparatus comprising:

a score reader to form an original image data of a score;

a processor for analyzing the original image data to recognize therefrom score elements to provide a corresponding score data;

a processor for synthesizing a synthetic image data of the score based upon the score data;

a display for displaying an original image and a synthetic image of the same score in a pair of split display areas arranged substantially in parallel based upon the original image data and the synthetic image data;

a user interface for receiving an operation command effective to designate size and shape of the split display areas; and a controller for controlling the display responsive to the operation command to automatically resize the displayed original image and synthetic image into respective split display areas having the designated size and shape, and to automatically optimize an arrangement of the pair of the split display areas, wherein the controller is responsive to an operation command for arranging the pair of the split display areas on left and right portions of the display, and is responsive to an operation command for automatically arranging the pair of split display areas on top and bottom portions of the display.

* * * * *